US011189311B2

(12) United States Patent
Ozawa et al.

(10) Patent No.: US 11,189,311 B2
(45) Date of Patent: Nov. 30, 2021

(54) MAGNETIC TAPE HAVING CHARACTERIZED MAGNETIC LAYER, MAGNETIC TAPE CARTRIDGE, AND MAGNETIC TAPE DEVICE

(71) Applicant: FUJIFILM Corporation, Tokyo (JP)

(72) Inventors: Eiki Ozawa, Minami-ashigara (JP); Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/777,393

(22) Filed: Jan. 30, 2020

(65) Prior Publication Data

US 2020/0251141 A1    Aug. 6, 2020

(30) Foreign Application Priority Data

Jan. 31, 2019 (JP) .............................. JP2019-016499

(51) Int. Cl.
| | | |
|---|---|---|
| G11B 5/714 | (2006.01) | |
| G11B 5/706 | (2006.01) | |
| G11B 5/78 | (2006.01) | |
| G11B 5/71 | (2006.01) | |
| G11B 5/73 | (2006.01) | |
| G11B 5/735 | (2006.01) | |
| G11B 5/733 | (2006.01) | |
| G11B 5/702 | (2006.01) | |

(52) U.S. Cl.
CPC .......... *G11B 5/714* (2013.01); *G11B 5/70605* (2013.01); *G11B 5/70626* (2013.01); *G11B 5/70678* (2013.01); *G11B 5/71* (2013.01); *G11B 5/73* (2013.01); *G11B 5/733* (2013.01); *G11B 5/7356* (2019.05); *G11B 5/78* (2013.01); *G11B 5/7022* (2013.01)

(58) Field of Classification Search
None
See application file for complete search history.

(56) References Cited

U.S. PATENT DOCUMENTS

| | | | | | |
|---|---|---|---|---|---|
| 3,953,657 | A | * | 4/1976 | Yamaguchi | C04B 20/1033 428/406 |
| 5,405,648 | A | * | 4/1995 | Hermann | B01J 2/006 427/213.31 |
| 8,535,817 | B2 | * | 9/2013 | Imaoka | G11B 5/70 428/844 |
| 9,837,116 | B2 | * | 12/2017 | Ozawa | G11B 5/00813 |
| 10,008,230 | B1 | * | 6/2018 | Ozawa | G11B 5/584 |
| 10,170,144 | B2 | * | 1/2019 | Ozawa | G11B 5/70 |
| 10,347,279 | B2 | * | 7/2019 | Ozawa | G11B 5/70 |
| 10,360,937 | B2 | * | 7/2019 | Ozawa | G11B 5/714 |
| 10,395,685 | B2 | * | 8/2019 | Ozawa | G11B 5/78 |
| 10,403,312 | B2 | * | 9/2019 | Ozawa | G11B 15/62 |
| 10,410,665 | B2 | * | 9/2019 | Ozawa | G11B 5/00813 |
| 10,431,251 | B2 | * | 10/2019 | Ozawa | G11B 5/78 |
| 10,438,623 | B2 | * | 10/2019 | Ozawa | G11B 5/71 |
| 10,438,625 | B2 | * | 10/2019 | Ozawa | G11B 5/71 |
| 10,482,915 | B2 | * | 11/2019 | Ozawa | G11B 5/3909 |
| 10,497,386 | B2 | * | 12/2019 | Ozawa | G11B 5/584 |
| 10,497,388 | B2 | * | 12/2019 | Ozawa | G11B 5/78 |
| 10,510,368 | B2 | * | 12/2019 | Ozawa | G11B 5/71 |
| 10,510,370 | B2 | * | 12/2019 | Ozawa | G11B 5/7305 |
| 10,540,996 | B2 | * | 1/2020 | Ozawa | G11B 5/70 |
| 10,692,528 | B2 | * | 6/2020 | Ozawa | G11B 20/10046 |
| 10,741,208 | B2 | * | 8/2020 | Kurokawa | G11B 5/127 |
| 10,854,232 | B2 | * | 12/2020 | Ozawa | G11B 5/70678 |
| 2006/0032146 | A1 | * | 2/2006 | Partch | C09K 3/1436 51/298 |
| 2006/0096179 | A1 | * | 5/2006 | Lu | C09C 1/3054 51/307 |
| 2011/0204027 | A1 | * | 8/2011 | Moriya | G03F 1/24 216/53 |
| 2011/0274947 | A1 | * | 11/2011 | Ishiguro | G11B 5/7334 428/840.4 |
| 2012/0045664 | A1 | | 2/2012 | Tanaka et al. | |
| 2020/0342903 | A1 | * | 10/2020 | Kasada | G11B 5/733 |
| 2020/0365179 | A1 | * | 11/2020 | Kasada | G01B 9/02041 |

FOREIGN PATENT DOCUMENTS

JP    2012-043495 A    3/2012

* cited by examiner

*Primary Examiner* — Kevin M Bernatz
(74) *Attorney, Agent, or Firm* — Sughrue Mion, PLLC

(57) ABSTRACT

The magnetic tape in which the followings are satisfied, after the magnetic layer is pressed at a pressure of 70 atm. A full width at half maximum of a spacing distribution measured by optical interferometry regarding a surface of the magnetic layer before performing a vacuum heating with respect to the magnetic tape is greater than 0 nm and equal to or smaller than 15.0 nm; a full width at half maximum of a spacing distribution measured after performing the vacuum heating is greater than 0 nm and equal to or smaller than 15.0 nm; and a difference ($S_{after}-S_{before}$) between a spacing $S_{after}$ measured by optical interferometry regarding the surface of the magnetic layer after performing the vacuum heating with respect to the magnetic tape and a spacing $S_{before}$ measured before performing the vacuum heating is greater than 0 nm and equal to or smaller than 12.0 nm.

19 Claims, 1 Drawing Sheet

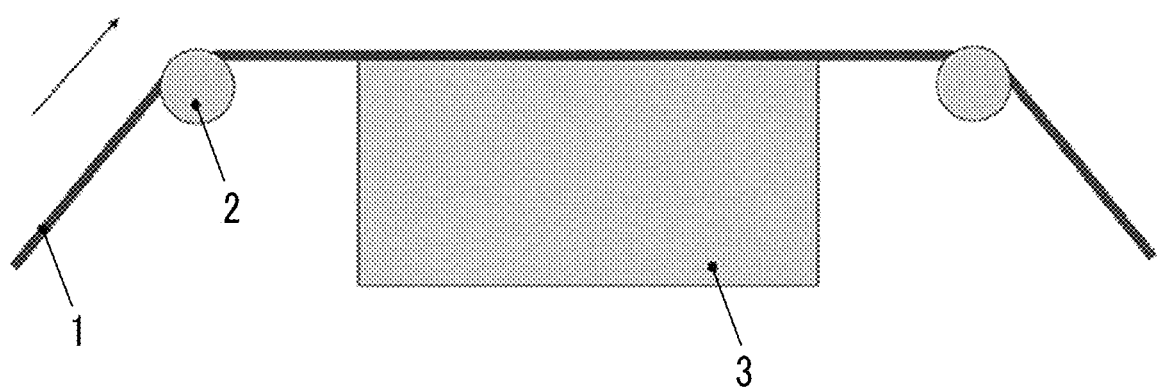

MAGNETIC TAPE HAVING CHARACTERIZED MAGNETIC LAYER, MAGNETIC TAPE CARTRIDGE, AND MAGNETIC TAPE DEVICE

CROSS-REFERENCE TO RELATED APPLICATIONS

This application claims priority under 35 U.S.C 119 to Japanese Patent Application No. 2019-016499 filed on Jan. 31, 2019. The above application is hereby expressly incorporated by reference, in its entirety, into the present application.

BACKGROUND OF THE INVENTION

1. Field of the Invention

The present invention relates to a magnetic tape, a magnetic tape cartridge, and a magnetic tape device.

2. Description of the Related Art

Magnetic recording media are divided into tape-shaped magnetic recording media and disk-shaped magnetic recording media, and tape-shaped magnetic recording media, that is, magnetic tapes are mainly used for storage of various data (for example, see JP2012-043495A).

SUMMARY OF THE INVENTION

The magnetic tape is generally accommodated in a magnetic tape cartridge in a state of being wound around a reel. Meanwhile, reproducing of information recorded on the magnetic tape is performed by setting the magnetic tape cartridge in a magnetic tape device called a drive and causing the magnetic tape to run in the magnetic tape device. However, in a case where the magnetic tape has deteriorated running stability, a reproducing output may decrease due to off-track. Thus, it is desirable that the magnetic tape has running stability.

Meanwhile, data recorded on various recording media such as a magnetic recording medium is called hot data, warm data, and cold data depending on access frequencies (reproducing frequencies). The access frequencies decrease in the order of hot data, warm data, and cold data, and the recording and storing of the data with low access frequency is referred to as "archive". The data amount recorded and stored on a magnetic recording medium for the archive increases in accordance with a dramatic increase in information contents and digitization of various information in recent years, and accordingly, a magnetic recording and reproducing system suitable for the archive is gaining attention.

Therefore, the inventors have conducted studies regarding the application of the magnetic tape for the archive, and a phenomenon in that the running stability decreases, in a case where the magnetic tape runs after an acceleration test equivalent to long-term storage was confirmed.

An object of an aspect of the invention is to provide a magnetic tape having excellent running stability after long-term storage.

As described above, the magnetic tape is generally accommodated in a magnetic tape cartridge in a state of being wound around a reel. Accordingly, the long-term storage of the magnetic tape after the data with a low access frequency is recorded, is performed in a state of being accommodated in the magnetic tape cartridge. In the magnetic tape wound around a reel, a surface of a magnetic layer and a surface of a back coating layer (in a case of including a back coating layer) or a non-magnetic support on a side opposite to a side of the magnetic layer (in a case of not including a back coating layer) come into contact with each other, and accordingly, the magnetic layer is pressed in the magnetic tape cartridge. As a result of various simulation by the inventors, it is determined that it is suitable to press the magnetic layer at a pressure of 70 atm in the acceleration test corresponding to long-term storage (example of archive) for approximately 10 years in an environment of relative humidity of 40% to 60% and room temperature. In the invention and the specification, the room temperature is a temperature of 20° C. to 25° C. The test for running stability after the magnetic layer is pressed at 70 atm is performed, and it is determined that the running stability is deteriorated, in a case where there is no countermeasure. With respect to this, as a result of intensive studies of the inventors, a new finding in which a magnetic tape satisfying the following (1) to (3) has running stability after the magnetic layer is pressed at 70 atm, that is, excellent running stability in a state corresponding to a state after the long-term storage, which is not known in the related art, was obtained, and one aspect of the invention has completed.

That is, one aspect of the invention relates to a magnetic tape comprising: a non-magnetic support; and a magnetic layer including a ferromagnetic powder, a binding agent, and a fatty acid ester, in which the following (1) to (3) are satisfied, after the magnetic layer is pressed at a pressure of 70 atm.

(1) a full width at half maximum of a spacing distribution measured by optical interferometry regarding a surface of the magnetic layer before performing a vacuum heating with respect to the magnetic tape is greater than 0 nm and equal to or smaller than 15.0 nm;

(2) a full width at half maximum of a spacing distribution measured by optical interferometry regarding the surface of the magnetic layer after performing the vacuum heating with respect to the magnetic tape is greater than 0 nm and equal to or smaller than 15.0 nm; and (3) a difference ($S_{after}-S_{before}$) between a spacing $S_{after}$ measured by optical interferometry regarding the surface of the magnetic layer after performing the vacuum heating with respect to the magnetic tape and a spacing $S_{before}$ measured by optical interferometry regarding the surface of the magnetic layer before performing the vacuum heating with respect to the magnetic tape is greater than 0 nm and equal to or smaller than 12.0 nm.

In an aspect, the full width at half maximum of a spacing distribution of (1) described above may be 0.5 nm to 15.0 nm.

In an aspect, the full width at half maximum of a spacing distribution of (2) described above may be 0.5 nm to 15.0 nm.

In an aspect, the difference of (3) described above may be 3.0 inn to 12.0 nm.

In an aspect, the magnetic layer may include inorganic oxide-based particles.

In an aspect, the inorganic oxide-based particles may be composite particles of inorganic oxide and a polymer.

In an aspect, the magnetic tape may comprise a non-magnetic layer including a non-magnetic powder and a binding agent between the non-magnetic support and the magnetic layer.

In an aspect, the magnetic tape may comprise a back coating layer including a non-magnetic powder and a binding agent on a surface side of the non-magnetic support opposite to a surface side provided with the magnetic layer.

Another aspect of the invention relates to a magnetic tape cartridge including the magnetic tape.

Still another aspect of the invention relates to a magnetic tape device comprising: the magnetic tape; and a magnetic head.

According to an aspect of the invention, it is possible to provide a magnetic tape having excellent running stability after long-term storage. According to the other aspects of the invention, it is possible to provide a magnetic tape cartridge including the magnetic tape, and a magnetic tape device including the magnetic tape.

BRIEF DESCRIPTION OF THE DRAWINGS

FIG. 1 is a schematic configuration diagram of a vibration imparting device used in Examples.

DESCRIPTION OF THE PREFERRED EMBODIMENTS

Magnetic Tape

One aspect of the invention relates to a magnetic tape including: a non-magnetic support; and a magnetic layer including a ferromagnetic powder, a binding agent, and a fatty acid ester, in which the following (1) to (3) are satisfied, after the magnetic layer is pressed at a pressure of 70 atm. 1 atm=101325 Pa (Pascal)=101325 N (Newton)/m$^2$.

(1) A full width at half maximum of a spacing distribution measured by optical interferometry regarding a surface of the magnetic layer before performing a vacuum heating with respect to the magnetic tape (hereinafter, also referred to as "FWHM$_{before}$") is greater than 0 nm and equal to or smaller than 15.0 nm;

(2) a full width at half maximum of a spacing distribution measured by optical interferometry regarding the surface of the magnetic layer after performing the vacuum heating with respect to the magnetic tape (hereinafter, also referred to as "FWHM$_{after}$") is greater than 0 nm and equal to or smaller than 15.0 nm; and (3) a difference ($S_{after}$–$S_{before}$) between a spacing $S_{after}$ measured by optical interferometry regarding the surface of the magnetic layer after performing the vacuum heating with respect to the magnetic tape and a spacing $S_{before}$ measured by optical interferometry regarding the surface of the magnetic layer before performing the vacuum heating with respect to the magnetic tape is greater than 0 nm and equal to or smaller than 12.0 nm.

The pressure of 70 atom of the pressing of the magnetic layer is a surface pressure applied to the surface of the magnetic layer by the pressing. By causing the magnetic tape to pass between two rolls while causing the magnetic tape to run at a speed of 20 m/min, the surface pressure of 70 atm is applied to the surface of the magnetic layer. A tension of 0.5 N/m is applied to the running magnetic tape in a longitudinal direction of the magnetic tape. The pressing is performed by causing the magnetic tape to pass between two rolls six times in total and applying the surface pressure of 70 atom at each time when passing each roll. A metal roll is used as the roll, and the roll is not heated. An environment for performing the pressing is an environment in which an atmosphere temperature is 20° C. to 25° C. and relative humidity is 40% to 60%. The magnetic tape to which the pressing is performed, is a magnetic tape which is not subjected to the long-term storage for 10 years or longer in an environment of relative humidity of 40% to 60% and room temperature, and the storage corresponding to such long-term storage or an acceleration test corresponding to such long-term storage. The same applies to various physical properties relating to the magnetic tape described in the invention and the specification, unless otherwise noted.

The pressing described above can be performed by using a calender treatment device used for manufacturing a magnetic recording medium. For example, a magnetic tape accommodated in a magnetic tape cartridge is cut out and caused to pass through calender rolls in the calender treatment device, and accordingly, the magnetic tape can be pressed at a pressure of 70 atm.

The magnetic tape according to an aspect of the invention satisfies (1) to (3) described above after the pressing. The spacing measured by optical interferometry regarding the surface of the magnetic layer of the magnetic tape for obtaining physical properties regarding (1) to (3) described above is a value measured by the following method.

In the invention and the specification, the "vacuum heating" of the magnetic tape is performed by holding the magnetic tape in an environment of a pressure of 200 Pa to 0.01 MPa and at an atmosphere temperature of 70° C. to 90° C. for 24 hours. In the invention and the specification, the "surface of the magnetic layer" of the magnetic tape is identical to the surface of the magnetic tape on the magnetic layer side.

In a state where the magnetic tape and a transparent plate-shaped member (for example, glass plate or the like) are overlapped on each other so that the surface of the magnetic layer of the magnetic tape faces the transparent plate-shaped member, a pressing member is pressed against the side of the magnetic tape opposite to the magnetic layer side at pressure of 0.5 atm. In this state, the surface of the magnetic layer of the magnetic tape is irradiated with light through the transparent plate-shaped member (irradiation region: 150,000 to 200,000 μm$^2$), and a spacing (distance) between the surface of the magnetic layer of the magnetic tape and the surface of the transparent plate-shaped member on the magnetic tape side is acquired based on intensity (for example, contrast of interference fringe image) of interference light generated due to a difference in an optical path between reflected light from the surface of the magnetic layer of the magnetic tape and reflected light from the surface of the transparent plate-shaped member on the magnetic tape side. The light emitted here is not particularly limited. In a case where the emitted light is light having an emission wavelength over a comparatively wide wavelength range as white light including light having a plurality of wavelengths, a member having a function of selectively cutting light having a specific wavelength or a wavelength other than wavelengths in a specific wavelength range, such as an interference filter, is disposed between the transparent plate-shaped member and a light reception unit which receives reflected light, and light at some wavelengths or some wavelength ranges of the reflected light is selectively incident to the light reception unit. In a case where the light emitted is light (so-called monochromatic light) having a single luminescence peak, the member described above may not be used. The wavelength of light incident to the light reception unit can be set to be in a range of 500 to 700 nm, for example. However, the wavelength of light incident to the light reception unit is not limited to be in the range described above. In addition, the transparent plate-shaped member may be a member having transparency with which light emitted passes, to the extent that the magnetic tape is irradiated with light through this member and interference light is obtained.

The measurement described above can be performed by using a commercially available tape spacing analyzer (TSA) such as Tape Spacing Analyzer manufactured by MicroPhysics, Inc., for example. The spacing measurement of Examples was performed by using Tape Spacing Analyzer manufactured by MicroPhysics, Inc.

In addition, the full width at half maximum of spacing distribution of the invention and the specification is a full width at half maximum (FWHM), in a case where the interference fringe image obtained by the measurement of the spacing described above is divided into 300,000 points, a spacing of each point (distance between the surface of the magnetic layer of the magnetic tape and the surface of the transparent plate-shaped member on the magnetic tape side) is acquired, this spacing is shown with a histogram, and this histogram is fit with Gaussian distribution. For example, two samples are cut out from the same magnetic tape, the FWHM obtained after performing vacuum heating with respect to one sample can be set as $FWHM_{after}$, and FWHM obtained without performing vacuum heating with respect to the other sample can be set as $FWHM_{before}$. Further, the difference ($S_{after}-S_{before}$) is a value obtained by subtracting a mode before the vacuum heating from a mode after the vacuum heating of the 300,000 points. For example, two samples are cut out from the same magnetic tape, and a value obtained by subtracting a mode obtained without performing the vacuum heating with respect to one sample from a mode obtained after performing the vacuum heating with respect to the other sample can be set as a difference ($S_{after}-S_{before}$).

The reproducing of data (information) recorded on the magnetic tape is normally performed by bringing the surface of the magnetic layer of the magnetic tape into contact with a magnetic head comprising a reproducing element and sliding. A portion (projection) at which a magnetic tape and a magnetic head are mainly in contact (so-called real contact), in a case of reproducing data recorded on the magnetic tape, and a portion lower than this portion (hereinafter, referred to as a "base part") normally exist on the surface of the magnetic layer. It is surmised that the spacing is a value which is an index of a distance between the head and the base part, in a case where the magnetic tape and the magnetic head comes into contact with each other and slide. However, it is thought that, in a case where a lubricant included in the magnetic layer forms a liquid film on the surface of the magnetic layer, the liquid film is present between the base part and the magnetic head, and thus, the spacing becomes narrow by the thickness of the liquid film.

However, the lubricant is generally divided broadly into a fluid lubricant and a boundary lubricant. Fatty acid ester included in the magnetic layer of the magnetic tape is known as a component which can function as a fluid lubricant. It is considered that a fluid lubricant can protect the surface of the magnetic layer by forming a liquid film on the surface of the magnetic layer. It is thought that the presence of the liquid film of fatty acid ester on the surface of the magnetic layer contributes to smooth sliding between the magnetic tape and the magnetic head (improvement of sliding properties). However, an excessive amount of fatty acid ester present on the surface of the magnetic layer causes sticking due to the formation of a meniscus (liquid crosslinking) between the surface of the magnetic layer and the head due to fatty acid ester, and decreases sliding properties.

In regards to this point, it is surmised that fatty acid ester is a component having properties of volatilizing by vacuum heating, and a difference ($S_{after}-S_{before}$) of a spacing between a state after the vacuum heating (state in which a liquid film of fatty acid ester is volatilized and removed) and a state before the vacuum heating (state in which the liquid film of fatty acid ester is present) can be an index of a thickness of the liquid film formed on the surface of the magnetic layer by fatty acid ester. It is surmised that, in the magnetic tape after the pressing, that is, in a state corresponding to the state after the long-term storage, the presence of the liquid film of fatty acid ester on the surface of the magnetic layer so that this value is greater than 0 nm and equal to or smaller than 12.0 nm contributes to improvement of sliding properties between the magnetic head and the magnetic tape, while preventing occurrence of sticking.

Meanwhile, a smaller value of the full width at half maximum of spacing distribution means that a variation in the values of the spacing measured on each part of the surface of the magnetic layer is small. It is thought that it is effective to increase the uniformity of a contact state between the surface of the magnetic layer and the head by increasing the uniformity of a height of projection present on the surface of the magnetic layer and increasing the uniformity of a thickness of a liquid film of fatty acid ester, in order to allow smooth sliding between the magnetic tape and the magnetic head.

In regards to this point, it is considered that the reason for the variation in values of the spacing is a variation in height of the projection of the surface of the magnetic layer and a variation in the thickness of the liquid film of fatty acid ester. It is surmised that the full width at half maximum $FWHM_{before}$ of the spacing distribution measured before the vacuum heating, that is, in a state where the liquid film of fatty acid ester is present on the surface of the magnetic layer, becomes great as the variation in height of the projection and the variation in the thickness of the liquid film of fatty acid ester are great, and particularly, the full width at half maximum $FWHM_{before}$ is greatly affected by the variation in the thickness of the liquid film of fatty acid ester. In contrast, the inventors have surmised that the full width at half maximum $FWHM_{after}$ of the spacing distribution measured after the vacuum heating, that is, in a state where the liquid film of fatty acid ester is removed from the surface of the magnetic layer, becomes great as the variation in height of the projection is great.

That is, it is surmised that small full widths at half maximum $FWHM_{before}$ and $FWHM_{after}$ of spacing distribution mean a small variation in the thickness of the liquid film of fatty acid ester and a small variation in the height of the projection on the surface of the magnetic layer. In addition, it is thought, in the magnetic tape after the pressing, that is, in a state corresponding to the state after the long-term storage, an increase in uniformity of the height of the projection and the thickness of the liquid film of fatty acid ester, so that both the full widths at half maximum $FWHM_{before}$ and $FWHM_{after}$ of spacing distribution are greater than 0 nm and equal to or smaller than 15.0 nm, contributes to the smooth sliding between the magnetic tape and the magnetic head.

Further, it is thought that the improvement of sliding properties between the magnetic tape and the magnetic head after the pressing, that is, in a state corresponding to the state after the long-term storage, contributes to the improvement of running stability after the long-term storage.

However, the above-mentioned description is merely a surmise and the invention is not limited thereto. In addition, the invention is not limited to other surmises described in the specification.

Hereinafter, the magnetic tape will be described more specifically.

Full Widths at Half Maximum $FWHM_{before}$ and $FWHM_{after}$ of Spacing Distribution Both the full widths at half maximum $FWHM_{before}$ of spacing distribution before the vacuum heating and the full widths at half maximum $FWHM_{after}$ of spacing distribution after the vacuum heating which are measured in the magnetic tape after the pressing are greater than 0 nm and equal to or smaller than 15.0 nm. As described above, it is surmised that this point contributes to the improvement of running stability after the long-term storage. From the viewpoint described above, the $FWHM_{before}$ and the $FWHM_{after}$ are preferably equal to or smaller than 14.0 nm, more preferably equal to or smaller than 13.0 nm, even more preferably equal to or smaller than 12.0 nm, still more preferably equal to or smaller than 11.0 nm, and still even more preferably equal to or smaller than 10.0 nm. The $FWHM_{before}$ and the $FWHM_{after}$ can be, for example, equal to or greater than 0.5 nm, equal to or greater than 1.0 nm, equal to or greater than 2.0 nm, or equal to or greater than 3.0 nm. However, a small value is preferable from the viewpoint described above, and therefore, the values thereof may be smaller than the exemplified values.

The full widths at half maximum $FWHM_{before}$ of spacing distribution before the vacuum heating of the magnetic tape after the pressing can be decreased, mainly in a case where the variation in the thickness of the liquid film of fatty acid ester is reduced and an increase of this variation due to the effect of the pressing can be prevented. An example of specific method will be described later. Meanwhile, the full widths at half maximum $FWHM_{after}$ of spacing distribution after the vacuum heating can be decreased, in a case where the variation in height of the projection of the surface of the magnetic layer can be reduced and an increase of this variation due to the effect of the pressing can be prevented. In order to reduce the variation in height of the projection of the surface of the magnetic layer, it is preferable that a presence state of the powder component included in the magnetic layer, for example, non-magnetic filler, which will be described later specifically, in the magnetic layer is controlled. An example of a specific method will be described later. In addition, in order to prevent an increase of the variation in thickness of the liquid film of fatty acid ester and the variation in height of the projection of the surface of the magnetic layer due to the effect of the pressing, it is surmised that a non-magnetic filler which is hardly penetrated into the magnetic layer, even in a case of being pressed, is preferably used, as a non-magnetic filler included in the magnetic layer. Details of such a non-magnetic filler will be described.

Difference ($S_{after} - S_{before}$)

The difference ($S_{after} - S_{before}$) of the spacings before and after the vacuum heating measured in the magnetic tape after the pressing is greater than 0 nm and equal to or smaller than 12.0 nm. It is surmised that this also contributes to the improvement of running stability after the long-term storage, as described above. From the viewpoint described above, the difference ($S_{after} - S_{before}$) is preferably equal to or greater than 0.1 nm, more preferably equal to or greater than 0.5 nm, even more preferably equal to or greater than 1.0 nm, still preferably equal to or greater than 1.5 nm, still more preferably equal to or greater than 2.0 nm, and still even more preferably equal to or greater than 2.5 nm. In addition, from the same viewpoint, the difference ($S_{after} - S_{before}$) is preferably equal to or smaller than 11.0 nm, more preferably equal to or smaller than 10.0 nm, even more preferably equal to or smaller than 9.0 nm, further preferably equal to or smaller than 8.0 nm, still preferably equal to or smaller than 7.0 nm, still more preferably equal to or smaller than 6.0 nm, still even more preferably equal to or smaller than 5.0 nm, and still further preferably equal to or smaller than 4.0 nm. The difference ($S_{after} - S_{before}$) can be controlled by the amount of fatty acid ester added to a magnetic layer forming composition. In addition, the difference ($S_{after} - S_{before}$) of the magnetic tape including the non-magnetic layer between the non-magnetic support and the magnetic layer can also be controlled by the amount of fatty acid ester added to a non-magnetic layer forming composition. This is because that the non-magnetic layer can have a function of holding a lubricant such as fatty acid ester or the like and supplying the lubricant to the magnetic layer and the fatty acid ester included in the non-magnetic layer can transfer to the magnetic layer and be present on the surface of the magnetic layer.

Next, the magnetic layer or the like included in the magnetic tape will be described more specifically.

Magnetic Layer

Ferromagnetic Powder

The magnetic layer includes a ferromagnetic powder and a binding agent. As the ferromagnetic powder included in the magnetic layer, a well-known ferromagnetic powder can be used as a ferromagnetic powder used in the magnetic layer of various magnetic recording media. It is preferable to use a ferromagnetic powder having an average particle size as the ferromagnetic powder, from a viewpoint of improvement of a recording density. From this viewpoint, an average particle size of the ferromagnetic powder is preferably equal to or smaller than 50 nm, more preferably equal to or smaller than 45 nm, even more preferably equal to or smaller than 40 nm, further preferably equal to or smaller than 35 nm, further more preferably equal to or smaller than 30 nm, further even more preferably equal to or smaller than 25 nm, and still preferably equal to or smaller than 20 nm. Meanwhile, from a viewpoint of stability of magnetization, the average particle size of the ferromagnetic powder is preferably equal to or greater than 5 nm, more preferably equal to or greater than 8 nm, even more preferably equal to or greater than 10 nm, still preferably equal to or greater than 15 nm, and still more preferably equal to or greater than 20 nm.

Hexagonal Ferrite Powder

As a preferred specific example of the ferromagnetic powder, a hexagonal ferrite powder can be used. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP-2015-127985A can be referred to, for example.

In the invention and the specification, the "hexagonal ferrite powder" is a ferromagnetic powder in which a hexagonal ferrite type crystal structure is detected as a main phase by X-ray diffraction analysis. The main phase is a structure to which a diffraction peak at the highest intensity in an X-ray diffraction spectrum obtained by the X-ray diffraction analysis belongs. For example, in a case where the diffraction peak at the highest intensity in the X-ray diffraction spectrum obtained by the X-ray diffraction analysis belongs to a hexagonal ferrite type crystal structure, it is determined that the hexagonal ferrite type crystal structure is detected as a main phase. In a case where only a single structure is detected by the X-ray diffraction analysis, this detected structure is set as a main phase. The hexagonal ferrite type crystal structure includes at least an iron atom, a divalent metal atom, and an oxygen atom as constituting atoms. A divalent metal atom is a metal atom which can be divalent cations as ions, and examples thereof include an alkali earth metal atom such as a strontium atom, a barium atom, or a calcium atom, and a lead atom. In the invention and the specification, the hexagonal strontium ferrite powder is powder in which a main divalent metal atom included in this powder is a strontium atom, and the hexagonal barium ferrite powder is a powder in which a main divalent metal atom included in this powder is a barium atom. The main divalent metal atom is a divalent metal atom occupying the greatest content in the divalent metal atom included in the powder based on atom %. However, the divalent metal atom described above does not include rare earth atom. The "rare earth atom" of the invention and the specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder which is one aspect of the hexagonal ferrite powder will be described more specifically.

An activation volume of the hexagonal strontium ferrite powder is preferably 800 to 1500 $nm^3$. The atomized hexagonal strontium ferrite powder showing the activation volume in the range described above is suitable for manufacturing a magnetic tape exhibiting excellent electromagnetic conversion characteristics. The activation volume of the hexagonal strontium ferrite powder is preferably equal to or greater than 800 $nm^3$, and can also be, for example, equal to or greater than 850 $nm^3$. In addition, from a viewpoint of further improving the electromagnetic conversion characteristics, the activation volume of the hexagonal strontium ferrite powder is more preferably equal to or smaller than 1400 $nm^3$, even more preferably equal to or smaller than 1300 $nm^3$, still preferably equal to or smaller than 1200 $nm^3$, and still more preferably equal to or smaller than 1100 $nm^3$.

The "activation volume" is a unit of magnetization reversal and an index showing a magnetic magnitude of the particles. Regarding the activation volume and an anisotropy constant Ku which will be described later disclosed in the invention and the specification, magnetic field sweep rates of a coercivity Hc measurement part at time points of 3 minutes and 30 minutes are measured by using an oscillation sample type magnetic-flux meter (measurement temperature: 23° C.±1° C.), and the activation volume and the anisotropy constant Ku are values acquired from the following relational expression of He and an activation volume V. A unit of the anisotropy constant Ku is 1 erg/cc=$1.0\times10^{-1}$ $J/m^3$.

$$Hc=2Ku/Ms\{1-[(kT/KuV)\ln(At/0.693)]^{1/2}\}$$

[In the expression, Ku: anisotropy constant (unit: $J/m^3$), Ms: saturation magnetization (unit: kA/m), k: Boltzmann's constant, T: absolute temperature (unit: K), V: activation volume (unit: $cm^3$), A: spin precession frequency (unit: $s^{-1}$), and t: magnetic field reversal time (unit: s)]

The anisotropy constant Ku can be used as an index of reduction of thermal fluctuation, that is, improvement of thermal stability. The hexagonal strontium ferrite powder can preferably have Ku equal to or greater than $1.8\times10^5$ $J/m^3$, and more preferably have Ku equal to or greater than $2.0\times10^5$ $J/m^3$. In addition, Ku of the hexagonal strontium ferrite powder can be, for example, equal to or smaller than $2.5\times10^5$ $J/m^3$. However, the high Ku is preferable, because it means high thermal stability, and thus, Ku is not limited to the exemplified value.

The hexagonal strontium ferrite powder may or may not include a rare earth atom. In a case where the hexagonal strontium ferrite powder includes the rare earth atom, a content (bulk content) of the rare earth atom is preferably 0.5 to 5.0 atom % with respect to 100 atom % of the iron atom. In an aspect, the hexagonal strontium ferrite powder including the rare earth atom can have a rare earth atom surface layer portion uneven distribution. The "rare earth atom surface layer portion uneven distribution" of the invention and the specification means that a content of rare earth atom with respect to 100 atom % of iron atom in a solution obtained by partially dissolving the hexagonal strontium ferrite powder with acid (hereinafter, referred to as a "rare earth atom surface layer portion content" or simply a "surface layer portion content" regarding the rare earth atom) and a content of rare earth atom with respect to 100 atom % of iron atom in a solution obtained by totally dissolving the hexagonal strontium ferrite powder with acid (hereinafter, referred to as a "rare earth atom bulk content" or simply a "bulk content" regarding the rare earth atom) satisfy a ratio of rare earth atom surface layer portion content/rare earth atom bulk content >1.0. The content of rare earth atom of the hexagonal ferrite powder is identical to the rare earth atom bulk content. With respect to this, the partial dissolving using acid is to dissolve the surface layer portion of particles configuring the hexagonal strontium ferrite powder, and accordingly, the content of rare earth atom in the solution obtained by the partial dissolving is the content of rare earth atom in the surface layer portion of the particles configuring the hexagonal strontium ferrite powder. The rare earth atom surface layer portion content satisfying a ratio of "rare earth atom surface layer portion content/rare earth atom bulk content >1.0" means that the rare earth atoms are unevenly distributed in the surface layer portion (that is, a larger amount of the rare earth atoms is present, compared to that inside), among the particles configuring the hexagonal strontium ferrite powder. The surface layer portion of the specification and the specification means a part of the region of the particles configuring the hexagonal strontium ferrite powder towards the inside from the surface.

In a case where the hexagonal ferrite powder includes the rare earth atom, the content of rare earth atom (bulk content) is preferably 0.5 to 5.0 atom % with respect to 100 atom % of iron atom. It is thought that the rare earth atom having the bulk content in the range described above and uneven distribution of the rare earth atom in the surface layer portion of the particles configuring the hexagonal strontium ferrite powder contribute to the prevention of a decrease in reproducing output during the repeated reproducing. It is surmised that this is because the rare earth atom having the bulk content in the range described above included in the hexagonal strontium ferrite powder and the uneven distribution of the rare earth atom in the surface layer portion of the particles configuring the hexagonal strontium ferrite powder can increase the anisotropy constant Ku. As the value of the anisotropy constant Ku is high, occurrence of a phenomenon called thermal fluctuation (that is, improvement of thermal stability) can be prevented. By preventing the occurrence of the thermal fluctuation, a decrease in reproducing output during the repeated reproducing can be prevented. It is surmised that the uneven distribution of the rare earth atom in the surface layer portion of the particles of the hexagonal strontium ferrite powder may contribute to stabilization of a spin at an iron (Fe) site in a crystal lattice of the surface layer portion, thereby increasing the anisotropy constant Ku.

In addition, it is surmised that the use of the hexagonal strontium ferrite powder having the rare earth atom surface layer portion uneven distribution also contributes to the prevention of chipping of the surface of the magnetic layer due to the sliding with the magnetic head. That is, it is surmised that, the hexagonal strontium ferrite powder having the rare earth atom surface layer portion uneven distribution can also contribute to the improvement of running stability of the magnetic tape. It is surmised that this is because the uneven distribution of the rare earth atom in the surface of the particles configuring the hexagonal strontium ferrite powder contributes to improvement of an interaction between the surface of the particles and an organic substance (for example, binding agent and/or additive) included in the magnetic layer, thereby improving hardness of the magnetic layer.

From a viewpoint of further preventing a decrease in reproducing output during the repeated reproducing and/or a viewpoint of further improving running stability, the content of rare earth atom (bulk content) is more preferably 0.5 to 4.5 atom %, even more preferably 1.0 to 4.5 atom %, and still preferably 1.5 to 4.5 atom %.

The bulk content is a content obtained by totally dissolving the hexagonal strontium ferrite powder. In the invention and the specification, the content of the atom is a bulk content obtained by totally dissolving the hexagonal strontium ferrite powder, unless otherwise noted. The hexagonal strontium ferrite powder may include only one kind of rare earth atom or may include two or more kinds of rare earth atom, as the rare earth atom. In a case where two or more kinds of rare earth atom are included, the bulk content is obtained from the total of the two or more kinds of rare earth atom. The same also applies to the other components of the invention and the specification. That is, for a given component, only one kind may be used or two or more kinds may be used, unless otherwise noted. In a case where two or more kinds are used, the content is a content of the total of the two or more kinds.

In a case where the hexagonal strontium ferrite powder includes the rare earth atom, the rare earth atom included therein may be any one or more kinds of the rare earth atom. Examples of the rare earth atom preferable from a viewpoint of further preventing the reproducing output during the repeated reproducing include a neodymium atom, a samarium atom, an yttrium atom, and a dysprosium atom, a neodymium atom, a samarium atom, and an yttrium atom are more preferable, and a neodymium atom is even more preferable.

A degree of uneven distribution of the rare earth atom is not limited, as long as the rare earth atom is unevenly distributed in the surface layer portion of the particles configuring the hexagonal strontium ferrite powder, in the hexagonal strontium ferrite powder having the rare earth atom surface layer portion uneven distribution. For example, regarding the hexagonal strontium ferrite powder having the rare earth atom surface layer portion uneven distribution, a ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" is greater than 1.0 and can be equal to or greater than 1.5. The "surface layer portion content/bulk content" equal to or greater than 1.0 means that the rare earth atoms are unevenly distributed in the surface layer portion (that is, a larger amount of the rare earth atoms is present, compared to that inside), in the particles configuring the hexagonal strontium ferrite powder. A ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" can be, for example, equal to or smaller than 10.0, equal to or smaller than 9.0, equal to or smaller than 8.0, equal to or smaller than 7.0, equal to or smaller than 6.0, equal to or smaller than 5.0, or equal to or smaller than 4.0. However, in the hexagonal strontium ferrite powder having the rare earth atom surface layer portion uneven distribution, the "surface layer portion content/bulk content" is not limited to the exemplified upper limit or the lower limit, as long as the rare earth atom is unevenly distributed in the surface layer portion of the particles configuring the hexagonal strontium ferrite powder.

The partial dissolving and the total dissolving of the hexagonal strontium ferrite powder will be described hereinafter. Regarding the hexagonal strontium ferrite powder present as the powder, sample powder for the partial dissolving and the total dissolving are collected from powder of the same batch. Meanwhile, regarding the hexagonal strontium ferrite powder included in a magnetic layer of a magnetic tape, a part of the hexagonal strontium ferrite powder extracted from the magnetic layer is subjected to the partial dissolving and the other part is subjected to the total dissolving. The extraction of the hexagonal strontium ferrite powder from the magnetic layer can be performed by a method disclosed in a paragraph 0032 of JP2015-091747A.

The partial dissolving means dissolving performed so that the hexagonal strontium ferrite powder remaining in the solution can be visually confirmed at the time of the completion of the dissolving. For example, by performing the partial dissolving, a region of the particles configuring the hexagonal strontium ferrite powder which is 10 to 20 mass % with respect to 100 mass % of a total of the particles can be dissolved. On the other hand, the total dissolving means dissolving performed until the hexagonal strontium ferrite powder remaining in the solution is not visually confirmed at the time of the completion of the dissolving.

The partial dissolving and the measurement of the surface layer portion content are, for example, performed by the following method. However, dissolving conditions such as the amount of sample powder and the like described below are merely examples, and dissolving conditions capable of performing the partial dissolving and the total dissolving can be randomly used.

A vessel (for example, beaker) containing 12 mg of sample powder and 10 ml of hydrochloric acid having a concentration of 1 mol/L is held on a hot plate at a set temperature of 70° C. for 1 hour. The obtained solution is filtered with a membrane filter having a hole diameter of 0.1 µm. The element analysis of the solution obtained as described above is performed by an inductively coupled plasma (ICP) analysis device. By doing so, the surface layer portion content of the rare earth atom with respect to 100 atom % of the iron atom can be obtained. In a case where a plurality of kinds of rare earth atoms are detected from the element analysis, a total content of the entirety of the rare earth atoms is the layer portion content. The same applies to the measurement of the bulk content.

Meanwhile, the total dissolving and the measurement of the bulk content are, for example, performed by the following method.

A vessel (for example, beaker) containing 12 mg of sample powder and 10 ml of hydrochloric acid having a concentration of 4 mol/L is held on a hot plate at a set temperature of 80° C. for 3 hours. After that, the process is performed in the same manner as in the partial dissolving and the measurement of the surface layer portion content, and the bulk content with respect to 100 atom % of the iron atom can be obtained.

From a viewpoint of increasing reproducing output in a case of reproducing data recorded on a magnetic tape, it is desirable that the mass magnetization σs of ferromagnetic powder included in the magnetic tape is high. In regards to this point, in hexagonal strontium ferrite powder which includes the rare earth atom but does not have the rare earth atom surface layer portion uneven distribution, σs tends to significantly decrease, compared to that in hexagonal strontium ferrite powder not including the rare earth atom. With respect to this, it is thought that, hexagonal strontium ferrite powder having the rare earth atom surface layer portion uneven distribution is also preferable for preventing such a significant decrease in σs. In one aspect, σs of the hexagonal strontium ferrite powder can be equal to or greater than 45 A·m²/kg and can also be equal to or greater than 47 A·m²/kg. On the other hand, from a viewpoint of noise reduction, σs is preferably equal to or smaller than 80 A·m²/kg and more preferably equal to or smaller than 60 A·m²/kg. σs can be measured by using a well-known measurement device capable of measuring magnetic properties such as an oscillation sample type magnetic-flux meter. In the invention and the specification, the mass magnetization σs is a value measured at a magnetic field strength of 1,194 kA/m (15 kOe), unless otherwise noted.

Regarding the content (bulk content) of the constituting atom in the hexagonal ferrite powder, a content of the strontium atom can be, for example, 2.0 to 15.0 atom % with respect to 100 atom % of the iron atom. In one aspect, in the hexagonal strontium ferrite powder, the divalent metal atom included in this powder can be only a strontium atom. In another aspect, the hexagonal strontium ferrite powder can also include one or more kinds of other divalent metal atoms, in addition to the strontium atom. For example, the hexagonal strontium ferrite powder can include a barium atom and/or a calcium atom. In a case where the divalent metal atom other than the strontium atom is included, a content of a barium atom and a content of a calcium atom in the hexagonal strontium ferrite powder respectively can be, for example, 0.05 to 5.0 atom % with respect to 100 atom % of the iron atom.

As the crystal structure of the hexagonal ferrite, a magnetoplumbite type (also referred to as an "M type"), a W type, a Y type, and a Z type are known. The hexagonal strontium ferrite powder may have any crystal structure. The crystal structure can be confirmed by X-ray diffraction analysis. In the hexagonal strontium ferrite powder, a single crystal structure or two or more kinds of crystal structure can be detected by the X-ray diffraction analysis. For example, in one aspect, in the hexagonal strontium ferrite powder, only the M type crystal structure can be detected by the X-ray diffraction analysis. For example, the M type hexagonal ferrite is represented by a compositional formula of $AFe_{12}O_{19}$. Here, A represents a divalent metal atom, in a case where the hexagonal strontium ferrite powder has the M type, A is only a strontium atom (Sr), or in a case where a plurality of divalent metal atoms are included as A, the strontium atom (Sr) occupies the hexagonal strontium ferrite powder with the greatest content based on atom % as described above. A content of the divalent metal atom in the hexagonal strontium ferrite powder is generally determined according to the type of the crystal structure of the hexagonal ferrite and is not particularly limited. The same applies to a content of an iron atom and a content of an oxygen atom. The hexagonal strontium ferrite powder at least includes an iron atom, a strontium atom, and an oxygen atom, and can also include a rare earth atom. In addition, the hexagonal strontium ferrite powder may or may not include atoms other than these atoms. As an example, the hexagonal strontium ferrite powder may include an aluminum atom (Al). A content of the aluminum atom can be, for example, 0.5 to 10.0 atom % with respect to 100 atom % of the iron atom. From a viewpoint of further preventing a decrease in reproducing output during the repeated reproducing, the hexagonal strontium ferrite powder may include an iron atom, a strontium atom, an oxygen atom, and a rare earth atom, and a content of the atom other than these atom is preferably equal to or smaller than 10.0 atom %, more preferably 0 to 5.0 atom % and may be 0 atom %, with respect to 100 atom % of the iron atom. That is, in one aspect, the hexagonal strontium ferrite powder may not include atoms other than the iron atom, the strontium atom, the oxygen atom, and the rare earth atom. The content shown with atom % described above is obtained by converting a value of the content (unit: mass %) of each atom obtained by totally dissolving the hexagonal strontium ferrite powder into a value shown as atom % by using the atomic weight of each atom. In addition, in the invention and the specification, a given atom which is "not included" means that the content thereof obtained by performing total dissolving and measurement by using an ICP analysis device is 0 mass %. A detection limit of the ICP analysis device is generally equal to or smaller than 0.01 ppm (parts per million) based on mass. The expression "not included" is used as a meaning including that a given atom is included with the amount smaller than the detection limit of the ICP analysis device. In one aspect, the hexagonal strontium ferrite powder does not include a bismuth atom (Bi).

Metal Powder

As a preferred specific example of the ferromagnetic powder, a ferromagnetic metal powder can also be used. For details of the ferromagnetic metal powder, descriptions disclosed in paragraphs 0137 to 0141 of JP2011-216149A and paragraphs 0009 to 0023 of JP2005-251351A can be referred to, for example.

ε-Iron Oxide Powder

As a preferred specific example of the ferromagnetic powder, an ε-iron oxide powder can also be used. In the invention and the specification, the "ε-iron oxide powder" is a ferromagnetic powder in which an ε-iron oxide type crystal structure is detected as a main phase by X-ray diffraction analysis. For example, in a case where the diffraction peak at the highest intensity in the X-ray diffraction spectrum obtained by the X-ray diffraction analysis belongs to an ε-iron oxide type crystal structure, it is determined that the ε-iron oxide type crystal structure is detected as a main phase. As a manufacturing method of the ε-iron oxide powder, a manufacturing method from a goethite, a reverse micelle method, and the like are known. All of the manufacturing methods are well known. For the method of manufacturing the ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. S1, pp. S280-S284, J.

Mater. Chem. C, 2013, 1, pp. 5200-5206 can be referred, for example. However, the manufacturing method of the ε-iron oxide powder capable of being used as the ferromagnetic powder in the magnetic layer of the magnetic tape is not limited to the method described here.

An activation volume of the ε-iron oxide powder is preferably 300 to 1500 nm$^3$. The atomized ε-iron oxide powder showing the activation volume in the range described above is suitable for manufacturing a magnetic tape exhibiting excellent electromagnetic conversion characteristics. The activation volume of the ε-iron oxide powder is preferably equal to or greater than 300 nm3, and can also be, for example, equal to or greater than 500 nm$^3$. In addition, from a viewpoint of further improving the electromagnetic conversion characteristics, the activation volume of the ε-iron oxide powder is more preferably equal to or smaller than 1400 nm$^3$, even more preferably equal to or smaller than 1300 nm$^3$, still preferably equal to or smaller than 1200 nm$^3$, and still more preferably equal to or smaller than 1100 nm$^3$.

The anisotropy constant Ku can be used as an index of reduction of thermal fluctuation, that is, improvement of thermal stability. The ε-iron oxide powder can preferably have Ku equal to or greater than $3.0 \times 10^4$ J/m$^3$, and more preferably have Ku equal to or greater than $8.0 \times 10^4$ J/m$^3$. In addition, Ku of the ε-iron oxide powder can be, for example, equal to or smaller than $3.0 \times 10^5$ J/m$^3$. However, the high Ku is preferable, because it means high thermal stability, and thus, Ku is not limited to the exemplified value.

From a viewpoint of increasing reproducing output in a case of reproducing data recorded on a magnetic tape, it is desirable that the mass magnetization σs of ferromagnetic powder included in the magnetic tape is high. In regard to this point, in one aspect, σs of the ε-iron oxide powder can be equal to or greater than 8 A·m$^2$/kg and can also be equal to or greater than 12 A·m$^2$/kg. On the other hand, from a viewpoint of noise reduction, σs of the ε-iron oxide powder is preferably equal to or smaller than 40 A·m$^2$/kg and more preferably equal to or smaller than 35 A·m$^2$/kg.

In the invention and the specification, average particle sizes of various powder such as the ferromagnetic powder and the like are values measured by the following method with a transmission electron microscope, unless otherwise noted.

The powder is imaged at a magnification ratio of 100,000 with a transmission electron microscope, the image is printed onto a printing paper so that a total magnification of 500,000 of an image of particles configuring the powder is obtained. A target particle is selected from the obtained image of particles, an outline of the particle is traced with a digitizer, and the size of the particle (primary particle) is measured. The primary particle is an independent particle which is not aggregated.

The measurement described above is performed regarding 500 particles arbitrarily extracted. An arithmetical mean of the particle size of 500 particles obtained as described above is the average particle size of the powder. As the transmission electron microscope, a transmission electron microscope H-9000 manufactured by Hitachi, Ltd. can be used, for example. In addition, the measurement of the particle size can be performed by a well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of the plurality of particles not only includes an aspect in which particles configuring the aggregate are directly in contact with each other, but also includes an aspect in which a binding agent or an additive which will be described later is interposed between the particles. A term "particles" is also used for describing the powder.

As a method for collecting a sample powder from the magnetic tape in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably in a range of 50 to 90 mass % and more preferably in a range of 60 to 90 mass %. The components other than the ferromagnetic powder of the magnetic layer are at least a binding agent and fatty acid ester, and one or more kinds of additives may be arbitrarily included. A high filling percentage of the ferromagnetic powder in the magnetic layer is preferable from a viewpoint of an improvement in the recording density.

Binding Agent and Curing Agent

The magnetic tape is a coating type magnetic tape and includes a binding agent in the magnetic layer. The binding agent is one or more kinds of resin. As the binding agent, various resins normally used as a binding agent of a coating type magnetic recording medium can be used. As the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be a homopolymer or a copolymer. These resins can be used as the binding agent even in the non-magnetic layer and/or a back coating layer which will be described later.

For the binding agent described above, descriptions disclosed in paragraphs 0028 to 0031 of JP2010-24113A can be referred to. In addition, the binding agent may be a radiation curable resin such as an electron beam-curable resin. For the radiation curable resin, descriptions disclosed in paragraphs 0044 and 0045 of JP2011-048878A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC) under the following measurement conditions. The weight-average molecular weight of the binding agent shown in examples which will be described later is a value obtained by performing polystyrene conversion of a value measured under the following measurement conditions.

GPC device: HLC-8120 (manufactured by Tosoh Corporation) Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with the resin which can be used as the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. This point is the same as regarding a layer formed by using a composition, in a case where the composition used for forming the other layer includes the curing agent. The preferred curing agent is a thermosetting compound, and polyisocyanate is suitable. For the details of polyisocyanate, descriptions disclosed in paragraphs 0124 and 0125 of JP2011-216149A can be referred to. The amount of the curing agent in the magnetic layer forming composition can be, for example, 0 to 80.0 parts by mass with respect to 100.0 parts by mass of the binding agent, and can be 50.0 to 80.0 parts by mass, from a viewpoint of improvement of hardness of the magnetic layer.

Fatty Acid Ester

The magnetic tape includes fatty acid ester in the magnetic layer. The fatty acid ester may be included alone as one type or two or more types thereof may be included. Examples of fatty acid ester include esters of lauric acid, myristic acid, palmitic acid, stearic acid, oleic acid, linoleic acid, linolenic acid, behenic acid, erucic acid, and elaidic acid. Specific examples thereof include butyl myristate, butyl palmitate, butyl stearate (butyl stearate), neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

The content of fatty acid ester as the content thereof in the magnetic layer forming composition is, for example, 0.1 to 10.0 parts by mass and is preferably 1.0 to 7.0 parts by mass with respect to 100.0 parts by mass of ferromagnetic powder. In a case of using two or more different kinds of fatty acid ester as the fatty acid ester, the content is a total content thereof. The same applies to the content of other components in the invention and the specification, unless otherwise noted. In the invention the specification, for a given component, only one kind may be used or two or more kinds may be used, unless otherwise noted.

In a case where the magnetic tape includes a non-magnetic layer between the non-magnetic support and the magnetic layer, the content of fatty acid ester in a non-magnetic layer forming composition is, for example, 0 to 15.0 parts by mass and preferably 0.1 to 10.0 parts by mass, with respect to 100.0 parts by mass of the non-magnetic powder.

Other Lubricants

The magnetic tape includes fatty acid ester which is one kind of lubricants at least in the magnetic layer. The lubricants other than fatty acid ester may be arbitrarily included in the magnetic layer and/or the non-magnetic layer. As described above, the lubricant included in the non-magnetic layer may be moved to the magnetic layer. As the lubricant which may be arbitrarily included, fatty acid can be used. In addition, fatty acid amide and the like can also be used. Fatty acid ester is known as a component which can function as a liquid lubricant, whereas fatty acid and fatty acid amide are known as a component which can function as a boundary lubricant. It is considered that the boundary lubricant is a lubricant which can be adsorbed to a surface of powder (for example, ferromagnetic powder) and form a rigid lubricant film to decrease contact friction.

Examples of fatty acid include lauric acid, myristic acid, palmitic acid, stearic acid, oleic acid, linoleic acid, linolenic acid, behenic acid, erucic acid, and elaidic acid, and stearic acid, myristic acid, and palmitic acid are preferable, and stearic acid is more preferable. Fatty acid may be included in the magnetic layer in a state of salt such as metal salt.

As fatty acid amide, amide of various fatty acid described above is used, and examples thereof include lauric acid amide, myristic acid amide, palmitic acid amide, and stearic acid amide.

Regarding fatty acid and a derivative of fatty acid (amide and ester), a part derived from fatty acid of the fatty acid derivative preferably has a structure which is the same as or similar to that of fatty acid used in combination. As an example, in a case of using stearic acid as fatty acid, it is preferable to use stearic acid ester and/or stearic acid amide.

The content of fatty acid in the magnetic layer forming composition is, for example, 0 to 10.0 parts by mass, preferably 0.1 to 10.0 parts by mass, and more preferably 1.0 to 7.0 parts by mass, with respect to 100.0 parts by mass of the ferromagnetic powder. The content of fatty acid amide in the magnetic layer forming composition is, for example, 0 to 3.0 parts by mass, preferably 0 to 2.0 parts by mass, and more preferably 0 to 1.0 part by mass with respect to 100.0 parts by mass of the ferromagnetic powder.

In a case where the magnetic tape includes a non-magnetic layer between the non-magnetic support and the magnetic layer, the content of fatty acid in the non-magnetic layer forming composition is, for example, 0 to 10.0 parts by mass, preferably 1.0 to 10.0 parts by mass, and more preferably 1.0 to 7.0 parts by mass with respect to 100.0 parts by mass of the non-magnetic powder. The content of fatty acid amide in the non-magnetic layer forming composition is, for example, 0 to 3.0 parts by mass and preferably 0 to 1.0 part by mass with respect to 100.0 parts by mass of the non-magnetic powder.

Other Components

The magnetic layer may include one or more kinds of additives, if necessary, together with the various components described above. As the additives, a commercially available product can be suitably selected and used according to the desired properties. Alternatively, a compound synthesized by a well-known method can be used as the additives. As the additives, the curing agent described above is used as an example. In addition, examples of the additive which can be included in the magnetic layer include a non-magnetic filler, a lubricant, a dispersing agent, a dispersing assistant, an antibacterial agent, an antistatic agent, and an antioxidant. The non-magnetic filler is identical to the non-magnetic particles or non-magnetic powder. As the non-magnetic filler, a non-magnetic filler which can function as a projection formation agent and a non-magnetic filler which can function as an abrasive can be used. As the additive, a well-known additive such as various polymers disclosed in paragraphs 0030 to 0080 of JP2016-051493A can also be used.

As the projection formation agent which is one aspect of the non-magnetic filler, particles of an inorganic substance can be used, particles of an organic substance can be used, and composite particles of the inorganic substance and the organic substance can also be used. Examples of the inorganic substance include inorganic oxide such as metal oxide, metal carbonate, metal sulfate, metal nitride, metal carbide, and metal sulfide, and inorganic oxide is preferable. In one aspect, the projection formation agent can be inorganic oxide-based particles. Here, "-based" means "-containing". One aspect of the inorganic oxide-based particles is particles formed of inorganic oxide. Another aspect of the inorganic oxide-based particles is composite particles of inorganic oxide and an organic substance, and as a specific example, composite particles of inorganic oxide and a polymer can be used. As such particles, for example, particles obtained by binding a polymer to a surface of the inorganic oxide particle can be used.

An average particle size of the projection formation agent is, for example, 30 to 300 nm and is preferably 40 to 200 nm. As the shape of the particles is a shape close to a sphere, indentation resistance exerted during a large pressure is applied is small, and accordingly, the particles are easily pushed into the magnetic layer. With respect to this, in a case where the shape of the particles is a shape other than the sphere, for example, a shape of a so-called deformed shape, a large indentation resistance is easily exerted, in a case where a large pressure is applied, and accordingly, particles are hardly pushed into the magnetic layer. In addition, regarding the particles having a low surface smoothness in which a surface of the particle is not even, the indentation resistance is easily exerted, in a case where a large pressure is applied, and accordingly, the particles are hardly pushed into the magnetic layer. It is thought that, in a case where the particles which are easily pushed into the magnetic layer are included in the magnetic layer, a variation in height of projection of the surface of the magnetic layer increases, due to such particles pushed into the magnetic layer due to the pressing, and the $Fwhm_{after}$ measured after pressing at a pressure of 70 atm increases. In addition, it is thought that, a variation in thickness of a liquid film of fatty acid ester present on the surface of the magnetic layer increases by pushing the particles which are easily pushed into the magnetic layer, into the magnetic layer by the pressing, the $FWHM_{before}$ measured after pressing at a pressure of 70 atm increases. Therefore, it is surmised that the particles of the projection formation agent which are hardly pushed into the magnetic layer by the pressing contribute to a decrease in $FWHM_{before}$ and $Fwhm_{after}$ measured after the pressing at a pressure of 70 atm.

The abrasive which is another aspect of the non-magnetic filler is preferably non-magnetic powder having Mohs hardness exceeding 8 and more preferably non-magnetic powder having Mohs hardness equal to or greater than 9. With respect to this, the Mohs hardness of the projection formation agent can be, for example, equal to or smaller than 8 or equal to or smaller than 7. A maximum value of Mohs hardness is 10 of diamond. Specific examples thereof include powders of alumina ($Al_2O_3$), silicon carbide, boron carbide ($B_4C$), $SiO_2$, TiC chromium oxide ($Cr_2O_3$), cerium oxide, zirconium oxide ($ZrO_2$), iron oxide, diamond, and the like, and among these, alumina powder such as α-alumina and silicon carbide powder are preferable. The average particle size of the abrasive is, for example, in a range of 30 to 300 nm and preferably in a range of 50 to 200 nm.

From a viewpoint of causing the projection formation agent and the abrasive to exhibit these functions in more excellent manner, a content of the projection formation agent in the magnetic layer is preferably 1.0 to 4.0 parts by mass and more preferably 1.5 to 3.5 parts by mass, with respect to 100.0 parts by mass of the ferromagnetic powder. Meanwhile, a content of the abrasive in the magnetic layer is preferably 1.0 to 20.0 parts by mass, more preferably 3.0 to 15.0 parts by mass, and even more preferably 4.0 to 10.0 parts by mass, with respect to 100.0 parts by mass of the ferromagnetic powder.

As an example of the additive which can be used in the magnetic layer including the abrasive, a dispersing agent disclosed in paragraphs 0012 to 0022 of JP2013-131285A can be used as a dispersing agent for improving dispersibility of the abrasive in the magnetic layer forming composition. For the dispersing agent, a description disclosed in paragraphs 0061 and 0071 of JP2012-133837A can be referred to. The dispersing agent may be included in the non-magnetic layer. For the dispersing agent which may be included in the non-magnetic layer, a description disclosed in a paragraph 0061 of JP2012-133837A can be referred to.

Non-Magnetic Layer

Next, the non-magnetic layer will be described. The magnetic tape may include a magnetic layer directly on the non-magnetic support or may include a non-magnetic layer including the non-magnetic powder and the binding agent between the non-magnetic support and the magnetic layer. The non-magnetic powder used in the non-magnetic layer may be a powder of an inorganic substance or a powder of an organic substance. In addition, carbon black and the like can be used. Examples of the inorganic substance include metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage)

of the non-magnetic powder of the non-magnetic layer is preferably in a range of 50 to 90 mass % and more preferably in a range of 60 to 90 mass %.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the magnetic tape also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or thermal treatment may be performed with respect to these supports in advance.

Back Coating Layer

The magnetic tape can also include or may not include a back coating layer including non-magnetic powder and a binding agent on a side of the non-magnetic support opposite to the surface side including the magnetic layer. The back coating layer preferably includes any one or both of carbon black and inorganic powder. In regards to the binding agent included in the back coating layer and various additives which can be arbitrarily included therein, a well-known technology regarding the back coating layer can be applied, and a well-known technology regarding the treatment of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

Various Thickness

A thickness of the non-magnetic support is preferably 3.0 to 6.0 μm.

A thickness of the magnetic layer is preferably equal to or smaller than 0.15 μm and more preferably equal to or smaller than 0.1 μm, from a viewpoint of realizing recording at high density required in recent years. The thickness of the magnetic layer is more preferably 0.01 to 0.1 μm. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is the total thickness of the layers.

The thickness of the non-magnetic layer is, for example, 0.1 to 1.5 μm and is preferably 0.1 to 1.0 μm.

A thickness of the back coating layer is preferably equal to or smaller than 0.9 μm and more preferably in a range of 0.1 to 0.7 μm.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scan electron microscope. In the cross section observation, various thicknesses can be acquired as a thickness acquired at one position of the cross section, or an arithmetical mean of thicknesses acquired at a plurality of positions of two or more positions, for example, two positions which are arbitrarily extracted. In addition, the thickness of each layer may be acquired as a designed thickness calculated according to the manufacturing conditions.

Manufacturing Method

Preparation of Each Layer Forming Composition

Each composition for forming the magnetic layer, the non-magnetic layer, or the back coating layer normally includes a solvent, together with various components described above. As the solvent, various organic solvents generally used for manufacturing a coating type magnetic recording medium can be used. Among those, from a viewpoint of solubility of the binding agent normally used in the coating type magnetic recording medium, the each layer forming composition preferably includes one or more ketone solvents such as acetone, methyl ethyl ketone, methyl isobutyl ketone, diisobutyl ketone, cyclohexanone, isophorone, and tetrahydrofuran. The amount of the solvent of the each layer forming composition is not particularly limited, and can be set to be the same as that of the each layer forming composition of a typical coating type magnetic recording medium. In addition, steps of preparing the each layer forming composition can generally include at least a kneading step, a dispersing step, and a mixing step provided before and after these steps, if necessary. Each step may be divided into two or more stages. The component used in the preparation of each layer forming composition may be added at an initial stage or in a middle stage of each step. In addition, each raw material may be separately added in two or more steps. For example, a binding agent may be separately added in a kneading step, a dispersing step, and a mixing step for adjusting viscosity after the dispersion. In a manufacturing step of the magnetic tape, a well-known manufacturing technology of the related art can be used as a part or all of the steps. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP1989-079274A (JP-H01-079274A). In addition, in order to disperse the each layer forming composition, glass beads and/or other beads can be used. As such dispersion beads, zirconia beads, titania beads, and steel beads which are dispersion beads having high specific gravity are suitable. These dispersion beads are preferably used by optimizing a bead diameter and a filling percentage. As a dispersion device, a well-known dispersion device can be used. Each layer forming composition may be filtered by a well-known method before performing the coating step. The filtering can be performed by using a filter, for example. As the filter used in the filtering, a filter having a hole diameter of 0.01 to 3 μm (for example, filter made of glass fiber or filter made of polypropylene) can be used, for example.

Coating Step

The magnetic layer can be formed, for example, by directly applying the magnetic layer forming composition onto the non-magnetic support or performing multilayer coating of the magnetic layer forming composition with the non-magnetic layer forming composition in order or at the same time. In an aspect of performing an alignment process, while the coating layer of the magnetic layer forming composition is wet, the alignment process is performed with respect to the coating layer in an alignment zone. For the alignment process, various technologies disclosed in a paragraph 0052 of JP2010-024113A can be applied. For example, a homeotropic alignment process can be performed by a well-known method such as a method using a different polar facing magnet. In the alignment zone, a drying speed of the coating layer can be controlled by a temperature, an air flow of the dry air and/or a transporting rate of the magnetic tape in the alignment zone. In addition, the coating layer may be preliminarily dried before transporting to the alignment zone.

The back coating layer can be formed by applying the back coating layer forming composition to a side of the non-magnetic support opposite to a side provided with the magnetic layer (or to be provided with the magnetic layer). For details of the coating for forming each layer, a description disclosed in a paragraph 0066 of JP2010-231843A can be referred to.

Other Steps

For other various steps for manufacturing the magnetic tape, a description disclosed in paragraphs 0067 to 0070 of JP2010-231843A can be referred to. A servo pattern can be formed on the magnetic tape by a well-known method, in order to realize tracking control of a magnetic head of the magnetic tape device and control of a running speed of the magnetic tape. The "formation of the servo pattern" can be "recording of a servo signal". The servo pattern is generally formed along a longitudinal direction of the magnetic tape. As a method of control using a servo signal (servo control), timing-based servo (TBS), amplitude servo, or frequency servo is used. Hereinafter, the recording of the servo signal will be further described.

As shown in European Computer Manufacturers Association (ECMA)-319, a timing-based servo system is used in a magnetic tape based on a linear tape-open (LTO) standard (generally referred to as an "LTO tape"). In this timing-based servo system, the servo signal is configured by continuously disposing a plurality of pairs of magnetic stripes (also referred to as "servo stripes") not parallel to each other in a longitudinal direction of the magnetic tape. As described above, a reason for that the servo signal is configured with one pair of magnetic stripes not parallel to each other is because a servo signal reading element passing on the servo signal recognizes a passage position thereof. Specifically, one pair of the magnetic stripes are formed so that a gap thereof is continuously changed along the width direction of the magnetic tape, and a relative position of the servo signal and the servo signal reading element can be recognized, by the reading of the gap thereof by the servo signal reading element. The information of this relative position can realize the tracking of a data track. Accordingly, a plurality of servo tracks are generally set on the servo signal along the width direction of the magnetic tape.

The servo band is configured of a servo signal continuous in the longitudinal direction of the magnetic tape. A plurality of servo bands are normally provided on the magnetic tape. For example, the number thereof is 5 in the LTO tape. A region interposed between two adjacent servo bands is called a data band. The data band is configured of a plurality of data tracks and each data track corresponds to each servo track.

In one aspect, as shown in JP2004-318983A, information showing the number of servo band (also referred to as "servo band identification (ID)" or "Unique Data Band Identification Method (UDIM) information") is embedded in each servo band. This servo band ID is recorded by shifting a specific servo stripe among the plurality of pair of servo stripes in the servo band so that the position thereof is relatively deviated in the longitudinal direction of the magnetic tape. Specifically, the position of the shifted specific servo stripe among the plurality of pair of servo stripes is changed for each servo band. Accordingly, the recorded servo band ID becomes unique for each servo band, and therefore, the servo band can be uniquely specified by only reading one servo band by the servo signal reading element.

In a method of uniquely specifying the servo band, a staggered method as shown in ECMA-319 is used. In this staggered method, the group of one pair of magnetic stripes (servo stripe) not parallel to each other which are continuously disposed in the longitudinal direction of the magnetic tape is recorded so as to be shifted in the longitudinal direction of the magnetic tape for each servo band. A combination of this shifted servo band between the adjacent servo bands is set to be unique in the entire magnetic tape, and accordingly, the servo band can also be uniquely specified by reading of the servo signal by two servo signal reading elements.

In addition, as shown in ECMA-319, information showing the position in the longitudinal direction of the magnetic tape (also referred to as "Longitudinal Position (LPOS) information") is normally embedded in each servo band. This LPOS information is recorded so that the position of one pair of servo stripes are shifted in the longitudinal direction of the magnetic tape, in the same manner as the UDIM information. However, unlike the UDIM information, the same signal is recorded on each servo band in this LPOS information.

Other information different from the UDIM information and the LPOS information can be embedded in the servo band. In this case, the embedded information may be different for each servo band as the UDIM information, or may be common in all of the servo bands, as the LPOS information.

In addition, as a method of embedding the information in the servo band, a method other than the method described above can be used. For example, a predetermined code may be recorded by thinning out a predetermined pair among the group of pairs of the servo stripes.

A servo signal recording (servo pattern forming) head is referred to as a servo write head. The servo write head includes pairs of gaps corresponding to the pairs of magnetic stripes by the number of servo bands. In general, a core and a coil are respectively connected to each of the pairs of gaps, and a magnetic field generated in the core can generate leakage magnetic field in the pairs of gaps, by supplying a current pulse to the coil. In a case of recording the servo signal, by inputting a current pulse while causing the magnetic tape to run on the servo write head, the magnetic pattern corresponding to the pair of gaps is transferred to the magnetic tape, and the servo signal can be recorded.

A width of each gap can be suitably set in accordance with a density of the servo signal to be recorded. The width of each gap can be set as, for example, equal to or smaller than 1 $\mu$m, 1 to 10 $\mu$m, or equal to or greater than 10 $\mu$m.

Before recording the servo signal on the magnetic tape, a demagnetization (erasing) process is generally performed on the magnetic tape. This erasing process can be performed by applying a uniform magnetic field to the magnetic tape by using a DC magnet and an AC magnet. The erasing process includes direct current (DC) erasing and alternating current (AC) erasing. The AC erasing is performed by slowing decreasing an intensity of the magnetic field, while reversing a direction of the magnetic field applied to the magnetic tape. Meanwhile, the DC erasing is performed by adding the magnetic field in one direction to the magnetic tape. The DC erasing further includes two methods. A first method is horizontal DC erasing of applying the magnetic field in one direction along a longitudinal direction of the magnetic tape. A second method is vertical DC erasing of applying the magnetic field in one direction along a thickness direction of the magnetic tape. The erasing process may be performed with respect to all of the magnetic tape or may be performed for each servo band of the magnetic tape.

A direction of the magnetic field to the servo signal to be recorded is determined in accordance with the direction of erasing. For example, in a case where the vertical DC erasing is performed to the magnetic tape, the recording of the servo signal is performed so that the direction of the magnetic field and the direction of erasing becomes opposite to each other. Accordingly, the output of the servo signal obtained by the reading of the servo signal can be increased. As disclosed in JP2012-053940A, in a case where the pattern is transferred to the magnetic tape subjected to the vertical DC erasing by using the gap, the reading signal of the recorded servo signal has a unipolar pulse shape. Meanwhile, in a case where the pattern is transferred to the magnetic tape subjected to the horizontal DC erasing by using the gap, the reading signal of the recorded servo signal has a bipolar pulse shape.

One Aspect of Preferred Manufacturing Method

As a preferred manufacturing method of the magnetic tape, a manufacturing method of applying vibration to the magnetic layer can be used, in order to improve uniformity of the thickness of the liquid film of fatty acid ester on the surface of the magnetic layer. It is surmised that, by adding vibration, the liquid film of fatty acid ester on the surface of the magnetic layer flows and the uniformity of the thickness of the liquid film is improved. That is, the magnetic tape can be manufactured by a manufacturing method of forming the magnetic layer by applying the magnetic layer forming composition including ferromagnetic powder, a binding agent, and fatty acid ester on the non-magnetic support and drying, and applying vibration to the formed magnetic layer.

Means for applying vibration are not particularly limited. For example, the vibration can be applied to the magnetic layer, by bringing the surface of the non-magnetic support, provided with the magnetic layer formed, on a side opposite to the magnetic layer to come into contact with a vibration imparting unit. The non-magnetic support, provided with the magnetic layer formed, may run while coming into contact with a vibration imparting unit. The vibration imparting unit, for example, includes an ultrasonic vibrator therein, and accordingly, vibration can be applied to a product coming into contact with the unit. It is possible to adjust the vibration applied to the magnetic layer by a vibration frequency, and strength of the ultrasonic vibrator, and/or the contact time with the vibration imparting unit. For example, the contact time can be adjusted by a running speed of the non-magnetic support, provided with the magnetic layer formed, while coming into contact with the vibration imparting unit. The vibration imparting conditions are not particularly limited, and may be set so as to control the full width at half maximum of the spacing distribution, particularly, the full width at half maximum $FWHM_{before}$ of the spacing distribution before vacuum heating. In order to set the vibration imparting conditions, a preliminary experiment can be performed before the actual manufacturing, and the conditions can be optimized. It is surmised that, as described above, the formation of the magnetic layer by using the particles which are hardly pushed into the magnetic layer by the pressing as the projection formation agent, contributes to the prevention of an increase in variation of thickness of the liquid film of fatty acid ester of the surface of the magnetic layer decreased by applying the vibration, by the pressing.

In addition, the full width at half maximum $FWHM_{after}$ spacing distribution after the vacuum heating tends to decrease in a case where the dispersion conditions of the magnetic layer forming composition are reinforced (for example, the number of times of dispersion is increased, the dispersion time is extended, and the like), and/or the filtering conditions are reinforced (for example, a filter having a small hole diameter is used as a filter used in the filtering, the number of times of filtering is increased, and the like). It is surmised that this is because the uniformity of the height of the projection present on the surface of the magnetic layer is improved, by improving dispersibility and/or the uniformity of the particle size of the particle material included in the magnetic layer forming composition, particularly, the non-magnetic filler which may function as the projection formation agent described above. A preliminary experiment can be performed before the actual manufacturing, and the dispersion conditions and/or the filtering conditions can be optimized. In addition, it is surmised that, as described above, the formation the particles which are hardly pushed into the magnetic layer by the pressing as the projection formation agent, contributes to the prevention of an increase in variation of height of the projection by the pressing.

As described above, it is possible to obtain the magnetic tape according to an aspect of the invention. However, the manufacturing method described above is merely an example, the $FWHM_{before}$, the $FWHM_{after}$, and the difference ($S_{after}-S_{before}$) can be controlled to be in respective ranges described above by a random method capable of adjusting the $FWHM_{before}$, the $FWHM_{after}$, and the difference ($S_{after}-S_{before}$) measured after the pressing at a pressure of 70 atm, and such an aspect is also included in the invention.

The magnetic tape described above is normally accommodated in a magnetic tape cartridge, and the magnetic tape cartridge is mounted on a magnetic tape device.

Magnetic Tape Cartridge

One aspect of the invention relates to a magnetic tape cartridge including the magnetic tape described above.

The details of the magnetic tape included in the magnetic tape cartridge are as described above. The magnetic tape can exhibit excellent running stability, even after the long-term storage in a state of being accommodated in the magnetic tape cartridge.

In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic tape device (drive) in order to record and/or reproduce data (magnetic signals)

on the magnetic tape, the magnetic tape is drawn from the magnetic tape cartridge and wound around the reel on the drive side. A magnetic head is disposed on a magnetic tape transportation path from the magnetic tape cartridge to a winding reel. Sending and winding of the magnetic tape are performed between a reel (supply reel) on the magnetic tape cartridge side and a reel (winding reel) on the drive side. In the meantime, the magnetic head comes into contact with and slides on the surface of the magnetic layer of the magnetic tape, and accordingly, the recording and/or reproduction of data is performed. With respect to this, in the twin reel type magnetic tape cartridge, both reels of the supply reel and the winding reel are provided in the magnetic tape cartridge. The magnetic tape cartridge may be any of single reel type magnetic tape cartridge and the twin reel type magnetic tape cartridge. The magnetic tape cartridge may include the magnetic tape according to an aspect of the invention and a well-known technology can be used for the other configurations.

Magnetic Tape Device

One aspect of the invention relates to a magnetic tape device including the magnetic tape and a magnetic head In the invention and the specification, the "magnetic tape device" means a device capable of performing at least one of the recording of data on the magnetic tape or the reproducing of data recorded on the magnetic tape. Such a device is generally called a drive. The magnetic tape device can be a sliding type magnetic tape device. The sliding type magnetic device is a device in which a surface of a magnetic layer and a magnetic head are in contact with each other and slide on each other, in a case of performing the recording of data on a magnetic tape and/or the reproducing of the recorded data.

The magnetic head included in the magnetic tape device can be a recording head capable of performing the recording of data on the magnetic tape, and can also be a reproducing head capable of performing the reproducing of data recorded on the magnetic tape. In addition, in the aspect, the magnetic tape device can include both of a recording head and a reproducing head as separate magnetic heads. In another aspect, the magnetic head included in the magnetic tape device can also have a configuration of including both of an element for recording data (recording element) and an element for reproducing data (reproducing element) in one magnetic head. Hereinafter, the element for recording data and the element for reproducing are collectively referred to as "elements for data". As the reproducing head, a magnetic head (MR head) including a magnetoresistive (MR) element capable of reading data recorded on the magnetic tape with excellent sensitivity as the reproducing element is preferable. As the MR head, various well-known MR heads such as an Anisotropic Magnetoresistive (AMR) head, a Giant Magnetoresistive (GMR) head, or a Tunnel Magnetoresistive (TMR) can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) including a servo signal reading element may be included in the magnetic tape device. For example, the magnetic head which performs the recording of data and/or the reproducing of the recorded data (hereinafter, also referred to as a "recording and reproducing head") can include two servo signal reading elements, and each of the two servo signal reading elements can read two adjacent servo bands at the same time. One or a plurality of elements for data can be disposed between the two servo signal reading elements.

In the magnetic tape device, the recording of data on the magnetic tape and/or the reproducing of data recorded on the magnetic tape can be performed by bringing the surface of the magnetic layer of the magnetic tape into contact with the magnetic head and sliding. The magnetic tape device may include the magnetic tape according to the aspect of the invention, and well-known technologies can be applied for the other configurations.

For example, in a case of the recording and/or reproducing information, first, the tracking is performed by using the servo signal. That is, as the servo signal reading element follows a predetermined servo track, the element for data is controlled to pass on the target data track. The movement of the data track is performed by changing the servo track to be read by the servo signal reading element in the tape width direction.

In addition, the recording and reproducing head can perform the recording and/or reproducing with respect to other data bands. In this case, the servo signal reading element is moved to a predetermined servo band by using the UDIM information described above, and the tracking with respect to the servo band may be started.

EXAMPLES

Hereinafter, the invention will be described with reference to examples. However, the invention is not limited to aspects shown in the examples. "Parts" and "%" in the following description are based on mass, unless otherwise noted. In addition, steps and evaluations described below are performed in an environment of an atmosphere temperature of 23° C.±1° C., unless otherwise noted. "eq" described below indicates equivalent and a unit not convertible into SI unit.

A projection formation agent used for manufacturing magnetic tape of examples or comparative examples is as follows. A projection formation agent 1 and a projection formation agent 3 are particles having a low surface smoothness of a surface of particles. A particle shape of a projection formation agent 2 is a shape of a cocoon. A particle shape of a projection formation agent 4 is a so-called indeterminate shape. A particle shape of a projection formation agent 5 is a shape closer to a sphere.

Projection formation agent 1: ATLAS (composite particles of silica and polymer) manufactured by Cabot Corporation, average particle size: 100 nm Projection formation agent 2: TGC6020N (silica particles) manufactured by Cabot Corporation, average particle size: 140 nm Projection formation agent 3: Cataloid (water dispersed sol of silica particles; as a projection formation agent for preparing a projection formation agent solution which will be described later, a dried solid material obtained by removing the solvent by heating the water dispersed sol described above is used) manufactured by JGC c&c, average particle size: 120 nm Projection formation agent 4: ASAHI #50 (carbon black) manufactured by Asahi Carbon Co., Ltd., average particle size: 300 nm Projection formation agent 5: PL-10L (water dispersed sol of silica particles; as a projection formation agent for preparing a projection formation agent solution which will be described later, a dried solid material obtained by removing the solvent by heating the water dispersed sol described above is used) manufactured by FUSO CHEMICAL CO., LTD., average particle size: 130 nm The following "BaFe" indicates hexagonal barium ferrite powder, "SrFe1" and "SrFe2" respectively indicate hexagonal strontium ferrite powder, and "ε-iron oxide" indicates ε-iron oxide powder.

Example 1

Magnetic Layer Forming Composition
Magnetic Solution
Ferromagnetic powder (BaFe (average particle size: 25 nm)): 100.0 parts
Sulfonic acid group-containing polyurethane resin: 15.0 parts
Cyclohexanone: 150.0 parts
Methyl ethyl ketone: 150.0 parts
Abrasive Liquid
α-alumina (average particle size of 110 nm): 9.0 parts
Vinyl chloride copolymer: (MR110 manufactured by Zeon Corporation): 0.7 parts
Cyclohexanone: 20.0 parts
Projection Formation Agent Liquid
Projection formation agent (see Table 1): 1.3 parts
Methyl ethyl ketone: 9.0 parts
Cyclohexanone: 6.0 parts
Other Components
Butyl stearate: see Table 1
Stearic acid: see Table 1
Polyisocyanate (CORONATE manufactured by Tosoh Corporation): 2.5 parts
Finishing Additive Solvent
Cyclohexanone: 180.0 parts
Methyl ethyl ketone: 180.0 parts
Non-Magnetic Layer Forming Composition
Non-magnetic inorganic powder (α-iron oxide): 80.0 parts
  (average particle size: 0.15 μm, average acicular ratio: 7, Brunauer-Emmett-Teller (BET) specific surface area: 52 $m^2/g$)
Carbon black (average particle size of 20 nm): 20.0 parts
Electron beam-curable vinyl chloride copolymer: 13.0 parts
Electron beam-curable polyurethane resin: 6.0 parts
Phenylphosphonic acid: 3.0 parts
Cyclohexanone: 140.0 parts
Methyl ethyl ketone: 170.0 parts
Butyl stearate: see Table 1
Stearic acid: see Table 1
Back Coating Layer Forming Composition
Non-magnetic inorganic powder (α-iron oxide): 80.0 parts
  (average particle size: 0.15 μm, average acicular ratio: 7, BET specific surface area: 52 $m^2/g$)
Carbon black (average particle size of 20 nm): 20.0 parts
Carbon black (average particle size of 100 nm): 3.0 parts
Vinyl chloride copolymer: 13.0 parts
Sulfonic acid group-containing polyurethane resin: 6.0 parts
Phenylphosphonic acid: 3.0 parts
Cyclohexanone: 140.0 parts
Methyl ethyl ketone: 170.0 parts
Stearic acid: 3.0 parts
Polyisocyanate (CORONATE manufactured by Tosoh Corporation): 5.0 parts
Methyl ethyl ketone: 400.0 parts Preparation of Each Layer Forming Composition The magnetic layer forming composition was prepared by the following method.

Various components of the magnetic solution was kneaded and diluted by an open kneader, and subjected to a dispersing process of 12 passes, with a transverse beads mill dispersion device and zirconia ($ZrO_2$) beads (hereinafter, referred to as "Zr beads") having a bead diameter of 0.5 mm, by setting a bead filling percentage as 80 volume %, a circumferential speed of rotor tip as 10 m/sec, and a retention time for 1 pass as 2 minutes, and accordingly, a magnetic solution was prepared.

After mixing the various components of the abrasive solution described above, the abrasive solution was put into a vertical sand mill dispersion device together with Zr beads having a bead diameter of 1 mm, a ratio of the bead volume with respect to a total of the abrasive solution volume and the bead volume was adjusted to be 60%, and the sand mill dispersing process was performed for 180 minutes. A solution after the sand mill dispersing process was extracted, and an ultrasonic dispersion filtering process was performed with a flow-type ultrasonic dispersion filtering device, and accordingly, an abrasive liquid was prepared.

The magnetic solution, the projection formation agent, the abrasive solution, other components, and the finishing additive solvent were introduced into a dissolver stirring device, and stirred at a circumferential speed of 10 m/sec for 30 minutes. After that, the treatment was performed with a flow-type ultrasonic dispersion device at a flow rate of 7.5 kg/min for the number of times of passes shown in Table 1, and then, a magnetic layer forming composition was prepared by performing filtering with a filter having a hole diameter shown in Table 1, for the number of times of passes shown in Table 1.

The non-magnetic layer forming composition was prepared by the following method.

Each component excluding a lubricant (butyl stearate and stearic acid) was kneaded with an open kneader and diluted, and then, was dispersed by using a horizontal beads mill dispersion device. After that, the lubricant (butyl stearate and stearic acid) was added thereto, and stirred and mixed with a dissolver stirring device, to prepare a non-magnetic layer forming composition.

The back coating layer forming composition was prepared by the following method.

Each component excluding the lubricant (stearic acid), polyisocyanate, and methyl ethyl ketone (400.0 parts) was kneaded with an open kneader and diluted, and then, was dispersed by using a horizontal beads mill dispersion device. After that, the lubricant (stearic acid), polyisocyanate, and methyl ethyl ketone (400.0 parts) were added thereto, and stirred and mixed with a dissolver stirring device, to prepare a back coating layer forming composition.

Manufacturing of Magnetic Tape

The non-magnetic layer forming composition was applied and dried on a biaxial stretching polyethylene naphthalate having a thickness of 5.0 μm so that a thickness after drying is 1.0 μm, and an electron beam was emitted at an acceleration voltage of 125 kV and energy of 40 kGy. The magnetic layer forming composition was applied and dried thereon so that a thickness after drying is 0.1 μm and a coating layer of the magnetic layer forming composition was formed.

After that, the support, provided with the coating layer formed, was installed into a vibration imparting device shown in FIG. 1 so that the surface thereof on a side opposite to the surface where the coating layer was formed came into contact with the vibration imparting unit, and the support (in FIG. 1, reference numeral 1), provided with the magnetic layer formed, was transported at a transportation speed of 0.5 m/sec, to apply vibration to the coating layer. In FIG. 1, a reference numeral 2 denotes a guide roller (a reference numeral 2 denotes one of the two guide rollers), a reference numeral 3 denotes the vibration imparting device (vibration imparting unit including the ultrasonic vibrator), and an arrow denotes the transportation direction. The time from the start of the contact of the arbitrary portion of the support, provided with the coating layer formed, with the vibration imparting unit until the end of the contact is shown in Table 1 as the vibration imparting time. The vibration imparting unit used includes an ultrasonic vibrator therein. The vibration was imparted by setting a vibration frequency and the intensity of the ultrasonic vibrator as the values shown in Table 1.

After that, the back coating layer forming composition was applied to the surface of the support on a side opposite to the surface where the non-magnetic layer and the magnetic layer were formed, so that the thickness after the drying became 0.5 μm, and dried.

After that, the surface smoothing treatment (calender process) was performed with a calender roll configured of only a metal roll, at a calender process speed of 80 m/min, linear pressure of 300 kg/cm (294 kN/m), and a surface temperature of a calender roll of 110° C.

Then, the thermal treatment was performed in the environment of the atmosphere temperature of 70° C. for 36 hours. After the thermal treatment, the slitting was performed so as to have a width of ½ inches (0.0127 meters), and the surface of the magnetic layer was cleaned with a tape cleaning device in which a nonwoven fabric and a razor blade are attached to a device including a sending and winding devices of the slit so as to press the surface of the magnetic layer, and then, in a state where the magnetic layer of the magnetic tape was demagnetized, servo patterns having disposition and shapes according to the Linear-Tape-Open (LTO) Ultrium format were formed on the magnetic layer by using a servo write head mounted on a servo writer. By doing so, a magnetic tape including data bands, servo bands, and guide bands in the disposition according to the LTO Ultrium format in the magnetic layer, and including servo patterns having the disposition and the shape according to the LTO Ultrium format on the servo band was obtained.

Examples 2 to 15 and Comparative Examples 1 to 16

A magnetic tape was obtained in the same manner as in Example 1, except that various items shown in Table 1 were changed as shown in Table 1.

In Table 1, in the comparative examples in which "none" is disclosed in a column of the ultrasonic vibration imparting conditions, a magnetic tape was manufactured by a manufacturing step not including a vibration imparting part.

Example 16

A magnetic tape was manufactured in the same manner as in Example 1, except that the ferromagnetic powder was changed to hexagonal strontium ferrite powder ("SrFe1" in Table 1) obtained by the following method.

Preparation Method of Hexagonal Strontium Ferrite Powder 1707 g of $SrCO_3$, 687 g of $H_3BO_3$, 1120 g of $Fe_2O_3$, 45 g of $Al(OH)_3$, 24 g of $BaCO_3$, 13 g of $CaCO_3$, and 235 g of $Nd_2O_3$ were weighed and mixed in a mixer to obtain a raw material mixture.

The obtained raw material mixture was dissolved in a platinum crucible at a dissolving temperature of 1390° C., and a tap hole provided on the bottom of the platinum crucible was heated while stirring the dissolved liquid, and the dissolved liquid was tapped in a rod shape at approximately 6 g/sec. The tap liquid was rolled and cooled with a water cooling twin roller to prepare an amorphous body.

280 g of the prepared amorphous body was put into an electronic furnace, heated to 635° C. (crystallization temperature) at a rate of temperature rise of 3.5° C./min, and held at the same temperature for 5 hours, and hexagonal strontium ferrite particles were precipitated (crystallized).

Then, the crystallized material obtained as described above including the hexagonal strontium ferrite particles was coarse-pulverized with a mortar, 1000 g of zirconia beads having a particle diameter of 1 mm and 800 ml of an acetic acid aqueous solution having a concentration of 1% were added to a glass bottle, and a dispersion process was performed in a paint shaker for 3 hours. After that, the obtained dispersion liquid and the beads were dispersed and put in a stainless still beaker. The dispersion liquid was left at a liquid temperature of 100° C. for 3 hours, subjected to a dissolving process of a glass component, precipitated with a centrifugal separator, decantation was repeated for cleaning, and drying was performed in a heating furnace at a furnace inner temperature of 110° C. for 6 hours, to obtain hexagonal strontium ferrite powder.

Regarding the hexagonal strontium ferrite powder obtained as described above, an average particle size was 18 nm, an activation volume was 902 $nm^3$, an anisotropy constant Ku was $2.2 \times 10^5$ $J/m^3$, and a mass magnetization σs was 49 $A \cdot m^2/kg$.

12 mg of a sample powder was collected from the hexagonal strontium ferrite powder obtained as described above, the element analysis of a filtrate obtained by the partial dissolving of this sample powder under the dissolving conditions described above was performed by the ICP analysis device, and a surface layer portion content of a neodymium atom was obtained.

Separately, 12 mg of a sample powder was collected from the hexagonal strontium ferrite powder obtained as described above, the element analysis of a filtrate obtained by the total dissolving of this sample powder under the dissolving conditions described above was performed by the ICP analysis device, and a bulk content of a neodymium atom was obtained.

The content (bulk content) of the neodymium atom in the hexagonal strontium ferrite powder obtained as described above with respect to 100 atom % of iron atom was 2.9 atom %. In addition, the surface portion content of the neodymium atom was 8.0 atom %. A ratio of the surface portion content and the bulk content, "surface portion content/bulk content" was 2.8 and it was confirmed that the neodymium atom is unevenly distributed on the surface layer of the particles.

A crystal structure of the hexagonal ferrite shown by the powder obtained as described above was confirmed by scanning CuKα ray under the condition of a voltage of 45 kV and intensity of 40 mA and measuring an X-ray diffraction pattern under the following conditions (X-ray diffraction analysis). The powder obtained as described above showed a crystal structure of magnetoplumbite type (M type) hexagonal ferrite. In addition, a crystal phase detected by the X-ray diffraction analysis was a magnetoplumbite type single phase.

PANalytical X'Pert Pro diffractometer, PIXcel detector
Soller slit of incident beam and diffraction beam: 0.017 radians
Fixed angle of dispersion slit: ¼ degrees
Mask: 10 mm
Scattering prevention slit: ¼ degrees
Measurement mode: continuous
Measurement time per 1 stage: 3 seconds
Measurement speed: 0.017 degrees per second
Measurement step: 0.05 degrees Example 17

A magnetic tape was manufactured in the same manner as in Example 1, except that the ferromagnetic powder was changed to hexagonal strontium ferrite powder ("SrFe2" in Table 1) obtained by the following method.

Preparation Method of Hexagonal Strontium Ferrite Powder 1725 g of $SrCO_3$, 666 g of $H_3BO_3$, 1332 g of $Fe_2O_3$, 52 g of $Al(OH)_3$, 34 g of $CaCO_3$, and 141 g of $BaCO_3$ were weighed and mixed in a mixer to obtain a raw material mixture.

The obtained raw material mixture was dissolved in a platinum crucible at a dissolving temperature of 1380° C., and a tap hole provided on the bottom of the platinum crucible was heated while stirring the dissolved liquid, and the dissolved liquid was tapped in a rod shape at approximately 6 g/sec. The tap liquid was cooled and rolled with a water cooling twin roll to prepare an amorphous body.

280 g of the obtained amorphous body was put into an electronic furnace, heated to 645° C. (crystallization temperature), and held at the same temperature for 5 hours, and hexagonal strontium ferrite particles were precipitated (crystallized).

Then, the crystallized material obtained as described above including the hexagonal strontium ferrite particles was coarse-pulverized with a mortar, 1000 g of zirconia beads having a particle diameter of 1 mm and 800 ml of an acetic acid aqueous solution having a concentration of 1% were added to a glass bottle, and a dispersion process was performed in a paint shaker for 3 hours. After that, the obtained dispersion liquid and the beads were dispersed and put in a stainless still beaker. The dispersion liquid was left at a liquid temperature of 100° C. for 3 hours, subjected to a dissolving process of a glass component, precipitated with a centrifugal separator, decantation was repeated for cleaning, and drying was performed in a heating furnace at a furnace inner temperature of 110° C. for 6 hours, to obtain hexagonal strontium ferrite powder.

Regarding the hexagonal strontium ferrite powder obtained as described above, an average particle size was 19 nm, an activation volume was 1102 $nm^3$, an anisotropy constant Ku was $2.0 \times 10^5$ $0.1/m^3$, and a mass magnetization σs was 50 A·$m^2$/kg.

Example 18

A magnetic tape was manufactured in the same manner as in Example 1, except that the ferromagnetic powder was changed to ε-iron oxide powder ("ε-iron oxide" in Table) obtained by the following method.

Preparation Method of ε-Iron Oxide Powder 4.0 g of ammonia aqueous solution having a concentration of 25% was added to a material obtained by dissolving 8.3 g of iron (III) nitrate nonahydrate, 1.3 g of gallium (III) nitrate octahydrate, 190 mg of cobalt (II) nitrate hexahydrate, 150 mg of titanium (IV) sulfate, and 1.5 g of polyvinyl pyrrolidone (PVP) in 90 g of pure water, while stirring by using a magnetic stirrer, in an atmosphere under the conditions of an atmosphere temperature of 25° C., and the mixture was stirred for 2 hours still under the temperature condition of the atmosphere temperature of 25° C. A citric acid solution obtained by dissolving 1 g of citric acid in 9 g of pure water was added to the obtained solution and stirred for 1 hour. The powder precipitated after the stirring was collected by centrifugal separation, washed with pure water, and dried in a heating furnace at a furnace inner temperature of 80° C.

800 g of pure water was added to the dried powder and the powder was dispersed in water again, to obtain a dispersion liquid. The obtained dispersion liquid was heated to a liquid temperature of 50° C., and 40 g of ammonia aqueous solution having a concentration of 25% was added dropwise while stirring. The stirring was performed for 1 hour while holding the temperature of 50° C., and 14 mL of tetraethoxysilane (TEOS) was added dropwise and stirred for 24 hours. 50 g of ammonium sulfate was added to the obtained reaction solution, the precipitated powder was collected by centrifugal separation, washed with pure water, and dried in a heating furnace at a furnace inner temperature of 80° C. for 24 hours, and a precursor of ferromagnetic powder was obtained.

The heating furnace at a furnace inner temperature of 1000° C. was filled with the obtained precursor of ferromagnetic powder in the atmosphere and subjected to thermal treatment for 4 hours.

The thermal-treated precursor of ferromagnetic powder was put into sodium hydroxide (NaOH) aqueous solution having a concentration of 4 mol/L, the liquid temperature was held at 70° C., stirring was performed for 24 hours, and accordingly, a silicon acid compound which was an impurity was removed from the thermal-treated precursor of ferromagnetic powder.

After that, by the centrifugal separation process, ferromagnetic powder obtained by removing the silicon acid compound was collected and washed with pure water, and ferromagnetic powder was obtained.

The composition of the obtained ferromagnetic powder was confirmed by Inductively Coupled Plasma-Optical Emission Spectrometry (ICP-OES), and Ga, Co, and Ti substitution type 2-iron oxide (s-$Ga_{0.58}Fe_{1.42}O_3$) was obtained. In addition, the X-ray diffraction analysis was performed under the same conditions as the conditions described regarding Example 16 above, and it was confirmed that the obtained ferromagnetic powder has a crystal structure of a single phase which is an ε phase not including a crystal structure of an α phase and a γ phase (ε-iron oxide type crystal structure) from the peak of the X-ray diffraction pattern.

Regarding the obtained (ε-iron oxide powder, an average particle size was 12 nm, an activation volume was 746 $nm^3$, an anisotropy constant Ku was $1.2 \times 10^5$ J/$m^3$, and a mass magnetization σs was 16 A·$m^2$/kg.

The activation volume and the anisotropy constant Ku of the hexagonal strontium ferrite powder and the (ε-iron oxide powder are values obtained by the method described above regarding each magnetic powder by using an oscillation sample type magnetic-flux meter (manufactured by Toei Industry Co., Ltd.).

In addition, the mass magnetization σs is a value measured at the magnetic field intensity of 1194 kA/m (15 kOe) by using an oscillation sample type magnetic-flux meter (manufactured by Toei Industry Co., Ltd.).

Evaluation Method of Magnetic Tape (1) Full Widths at Half Maximum $FWHM_{before}$ and $FWHM_{after}$ of Spacing Distribution Before and after Vacuum Heating after Pressing at Pressure of 70 Atm Each magnetic tape of the examples and the comparative examples was passed between two rolls (without heating the rolls) six times in total while running the magnetic tape in a longitudinal direction at a speed of 20 m/min in a state where a tension of 0.5 N/m was applied, by using a calender process device including a 7-step calender roll configured of only a metal roll in an environment of an atmosphere temperature of 20° C. to 25° C. and relative humidity of 40% to 60%, and accordingly, the pressing was performed by applying a surface pressure of 70 atm to the surface of each magnetic layer, during the passing between each roll.

Two samples having a length of 5 cm in a longitudinal direction were cut out from the magnetic tape after the pressing, one sample was subjected to the vacuum heating, and the other sample was not subjected to the vacuum heating, and the full widths at half maximum of spacing distribution were obtained by the following method by using a tape spacing analyzer (TSA) (manufactured by Micro-Physics, Inc.). A value obtained regarding the sample not subjected to the vacuum heating (that is, before vacuum heating) was set as $FWHM_{before}$, and a value obtained regarding the sample subjected to the vacuum heating was set as $FWHM_{after}$. In addition, a sample having a length of 100 m in a longitudinal direction was cut out from the same magnetic tape, and the evaluation of running stability shown below was performed.

In a state where a glass sheet (glass sheet manufactured by Thorlabs, Inc. (model no.: WG10530)) included in the TSA was disposed on the surface of the magnetic layer of the magnetic tape, a hemisphere was pressed against the surface of the back coating layer of the magnetic tape at pressure of 0.5 atm by using a hemisphere made of urethane included in the TSA as a pressing member. In this state, a given region (150,000 to 200,000 μm$^2$) of the surface of the magnetic layer of the magnetic tape was irradiated with white light from a stroboscope included in the TSA through the glass sheet, and the obtained reflected light was received by a charge-coupled device (CCD) through an interference filter (filter selectively passing light at a wavelength of 633 nm), and thus, an interference fringe image generated on the uneven part of the region was obtained.

This image was divided into 300,000 points, a distance (spacing) between the surface of the glass sheet on the magnetic tape side and the surface of the magnetic layer of the magnetic tape was acquired, and the full width at half maximum of spacing distribution was full width at half maximum, in a case where this spacing was shown with a histogram, and this histogram was fit with Gaussian distribution.

The vacuum heating was performed by storing the magnetic tape in a vacuum constant temperature drying machine with a degree of vacuum of 200 Pa to 0.01 Mpa and at inner atmosphere temperature of 70° C. to 90° C. for 24 hours.

(2) Difference ($S_{after}-S_{before}$) after Vacuum Heating after Pressing at Pressure of 70 atm The difference ($S_{after} S_{before}$) was a value obtained by subtracting a mode of the histogram obtained regarding the sample not subjected to the vacuum heating from a mode of the histogram obtained regarding the sample subjected to the vacuum heating obtained in the section (1).

(3) Evaluation of Running Stability after Pressing at Pressure of 70 Atm

Regarding each magnetic tape of the examples and the comparative examples, a position error signal (PES) was obtained by the following method after the pressing in the section (1).

The servo pattern was read by a verify head on the servo writer used for forming the servo pattern. The verify head is a reading magnetic head that is used for confirming quality of the servo pattern formed on the magnetic tape, and reading elements are disposed at positions corresponding to the positions of the servo pattern (position in the width direction of the magnetic tape), in the same manner as the magnetic head of a well-known magnetic tape device (drive).

A well-known PES arithmetic circuit which calculates the head positioning accuracy of the servo system as the PES from an electric signal obtained by reading the servo pattern by the verify head is connected to the verify head. The PES arithmetic circuit calculates a displacement from the input electric signal (pulse signal) in the width direction of the magnetic tape, as required, and a value obtained by applying a high pass filter (cut-off: 500 cycles/m) with respect to temporal change information (signal) of this displacement was calculated as PES. The PES can be an index of running stability and it is possible to evaluate that the running stability is excellent, in a case where the PES calculated described above is equal to or smaller than 18 nm.

(4) Center Line Average Surface Roughness Ra Measured Regarding Surface of Magnetic Layer Regarding each magnetic tape of the examples and the comparative examples, a center line average surface roughness Ra of the surface of the magnetic layer was measured by the following method, in a state where the pressing was not performed.

The measurement regarding a measurement area of 40 μm×40 μm in the surface of the back coating layer of the magnetic tape was performed with an atomic force microscope Nanoscope 4 manufactured by Veeco Instruments, Inc.) in a tapping mode, and a center line average surface roughness Ra was acquired. RTESP-300 manufactured by BRUKER was used as a probe, a scan speed (probe movement speed) was set as 40 μm/sec, and a resolution was set as 512 pixel×512 pixel.

It is preferable that the smoothness of the surface of the magnetic layer of the magnetic tape, from a viewpoint of improving electromagnetic conversion characteristics. From this viewpoint, the center line average surface roughness Ra measured in the surface of the magnetic layer of the magnetic tape is preferably equal to or smaller than 2.8 nm, more preferably equal to or smaller than 2.5 nm, and even more preferably equal to or smaller than 2.0 nm. In addition, the center line average surface roughness Ra can be, for example, equal to or greater than 1.2 nm or equal to or greater than 1.3 nm. However, from a viewpoint of improving electromagnetic conversion characteristics, the high smoothness of the surface of the magnetic layer of the magnetic tape is preferable, and thus, the center line average surface roughness Ra may be lower than the range exemplified above.

The results described above are shown in Table 1 (Tables 1-1 to 1-6).

TABLE 1-1

|  |  |  | Unit | Example 1 | Example 2 | Example 3 | Example 4 | Example 5 | Example 6 |
|---|---|---|---|---|---|---|---|---|---|
| Magnetic layer | Ferromagnetic powder | Kind | — | BaFe | BaFe | BaFe | BaFe | BaFe | BaFe |
|  | Projection formation agent | Kind | — | Projection formation agent 1 | Projection formation agent 2 | Projection formation agent 3 | Projection formation agent 1 | Projection formation agent 2 | Projection formation agent 3 |
| Magnetic layer forming composition | Butyl stearate | Content | Part | 1.0 | 1.0 | 1.0 | 1.0 | 1.0 | 1.0 |
|  | Stearic acid | Content | Part | 1.0 | 1.0 | 1.0 | 1.0 | 1.0 | 1.0 |
| Non-magnetic layer forming composition | Butyl stearate | Content | Part | 4.0 | 4.0 | 4.0 | 1.0 | 1.0 | 1.0 |
|  | Stearic acid | Content | Part | 1.0 | 1.0 | 1.0 | 1.0 | 1.0 | 1.0 |
|  | Ultrasonic vibration imparting conditions | Imparting time | Second | 0.5 | 0.5 | 0.5 | 0.5 | 0.5 | 0.5 |
|  |  | Frequency | kHz | 30 | 30 | 30 | 30 | 30 | 30 |
|  |  | Intensity | W | 100 | 100 | 100 | 100 | 100 | 100 |
|  | Magnetic layer forming composition preparation conditions | Number of times of passes of flow-type ultrasonic dispersion device | Times | 2 | 2 | 2 | 2 | 2 | 2 |
|  |  | Number of times of filtering | Times | 1 | 1 | 1 | 1 | 1 | 1 |
|  |  | Filter hole diameter | μm | 1.0 | 1.0 | 1.0 | 1.0 | 1.0 | 1.0 |
| Physical properties | Center line average surface roughness Ra of magnetic layer (before pressing) |  | nm | 1.7 | 1.7 | 1.7 | 1.7 | 1.7 | 1.7 |
|  | $S_{after}-S_{before}$ (after pressing) |  | nm | 3.0 | 3.0 | 3.0 | 0.5 | 0.5 | 0.5 |
|  | $FWHM_{before}$ (after pressing) |  | nm | 14.0 | 14.0 | 14.0 | 14.0 | 14.0 | 14.0 |
|  | $FWHM_{after}$ (after pressing) |  | nm | 14.0 | 14.0 | 14.0 | 14.0 | 14.0 | 14.0 |
| Evaluation result | PES |  | nm | 17 | 17 | 17 | 17 | 17 | 17 |

TABLE 1-2

|  |  |  | Unit | Example 7 | Example 8 | Example 9 | Example 10 | Example 11 | Example 12 |
|---|---|---|---|---|---|---|---|---|---|
| Magnetic layer | Ferromagnetic powder | Kind | — | BaFe | BaFe | BaFe | BaFe | BaFe | BaFe |
|  | Projection formation agent | Kind | — | Projection formation agent 1 | Projection formation agent 2 | Projection formation agent 3 | Projection formation agent 1 | Projection formation agent 2 | Projection formation agent 3 |
| Magnetic layer forming composition | Butyl stearate | Content | Part | 1.0 | 1.0 | 1.0 | 1.0 | 1.0 | 1.0 |
|  | Stearic acid | Content | Part | 1.0 | 1.0 | 1.0 | 1.0 | 1.0 | 1.0 |
| Non-magnetic layer forming composition | Butyl stearate | Content | Part | 10.0 | 10.0 | 10.0 | 4.0 | 4.0 | 4.0 |
|  | Stearic acid | Content | Part | 1.0 | 1.0 | 1.0 | 1.0 | 1.0 | 1.0 |
|  | Ultrasonic vibration imparting conditions | Imparting time | Second | 0.5 | 0.5 | 0.5 | 2.0 | 7.0 | 2.0 |
|  |  | Frequency | kHz | 30 | 30 | 30 | 30 | 30 | 30 |
|  |  | Intensity | W | 100 | 100 | 100 | 100 | 100 | 100 |
|  | Magnetic layer forming composition preparation conditions | Number of times of passes of flow-type ultrasonic dispersion device | Times | 7 | 2 | 2 | 70 | 20 | 20 |
|  |  | Number of times of filtering | Times | 1 | 1 | 1 | 5 | 5 | 5 |
|  |  | Filter hole diameter | μm | 1.0 | 1.0 | 1.0 | 0.5 | 0.5 | 0.5 |
| Physical properties | Center line average surface roughness Ra of magnetic layer (before pressing) |  | nm | 1.7 | 1.7 | 1.7 | 1.7 | 1.7 | 1.7 |

TABLE 1-2-continued

|  |  | Unit | Example 7 | Example 8 | Example 9 | Example 10 | Example 11 | Example 12 |
|---|---|---|---|---|---|---|---|---|
|  | $S_{after}-S_{before}$ (after pressing) | nm | 11.0 | 11.0 | 11.0 | 3.0 | 3.0 | 3.0 |
|  | $FWHM_{before}$ (after pressing) | nm | 14.0 | 14.0 | 14.0 | 9.0 | 9.0 | 9.0 |
|  | $FWHM_{after}$ (after pressing) | nm | 14.0 | 14.0 | 14.0 | 9.0 | 9.0 | 9.0 |
| Evaluation result | PES | nm | 17 | 17 | 17 | 14 | 14 | 14 |

TABLE 1-3

|  |  |  | Unit | Example 13 | Example 14 | Example 15 | Example 16 | Example 17 | Example 18 |
|---|---|---|---|---|---|---|---|---|---|
| Magnetic layer | Ferromagnetic powder | Kind | — | BaFe | BaFe | BaFe | SrFe1 | SrFe2 | ε-iron oxide |
|  | Projection formation agent | Kind | — | Projection formation agent 1 | Projection formation agent 2 | Projection formation agent 3 | Projection formation agent 1 | Projection formation agent 1 | Projection formation agent 1 |
| Magnetic layer forming composition | Butyl stearate | Content | Part | 1.0 | 1.0 | 1.0 | 1.0 | 1.0 | 1.0 |
|  | Stearic acid | Content | Part | 1.0 | 1.0 | 1.0 | 1.0 | 1.0 | 1.0 |
| Non-magnetic layer forming composition | Butyl stearate | Content | Part | 4.0 | 4.0 | 4.0 | 4.0 | 4.0 | 4.0 |
|  | Stearic acid | Content | Part | 1.0 | 1.0 | 1.0 | 1.0 | 1.0 | 1.0 |
|  | Ultrasonic vibration imparting conditions | Imparting time | Second | 5.0 | 5.0 | 5.0 | 0.5 | 0.5 | 0.5 |
|  |  | Frequency | kHz | 30 | 30 | 30 | 30 | 30 | 30 |
|  |  | Intensity | W | 100 | 100 | 100 | 100 | 100 | 100 |
|  | Magnetic layer forming composition preparation conditions | Number of times of passes of flow-type ultrasonic dispersion device | Times | 30 | 30 | 30 | 2 | 2 | 2 |
|  |  | Number of times of filtering | Times | 10 | 10 | 10 | 1 | 1 | 1 |
|  |  | Filter hole diameter | μm | 0.3 | 0.3 | 0.3 | 1.0 | 1.0 | 1.0 |
| Physical properties | Center line average surface roughness Ra of magnetic layer (before pressing) |  | nm | 1.7 | 1.7 | 1.7 | 1.7 | 1.7 | 1.7 |
|  | $S_{after}-S_{before}$ (after pressing) |  | nm | 3.0 | 3.0 | 3.0 | 3.0 | 3.0 | 3.0 |
|  | $FWHM_{before}$ (after pressing) |  | nm | 3.0 | 3.0 | 3.0 | 14.0 | 14.0 | 14.0 |
|  | $FWHM_{after}$ (after pressing) |  | nm | 3.0 | 3.0 | 3.0 | 14.0 | 14.0 | 14.0 |
| Evaluation result | PES |  | nm | 8 | 8 | 8 | 17 | 17 | 17 |

TABLE 1-4

|  |  |  | Unit | Comparative Example 1 | Comparative Example 2 | Comparative Example 3 | Comparative Example 4 | Comparative Example 5 | Comparative Example 6 |
|---|---|---|---|---|---|---|---|---|---|
| Magnetic layer | Ferromagnetic powder | Kind | — | BaFe | BaFe | BaFe | BaFe | BaFe | BaFe |
|  | Projection formation agent | Kind | — | Projection formation agent 4 | Projection formation agent 5 | Projection formation agent 4 | Projection formation agent 5 | Projection formation agent 1 | Projection formation agent 2 |
| Magnetic layer forming composition | Butyl stearate | Content | Part | 1.0 | 1.0 | 1.0 | 1.0 | 1.0 | 1.0 |
|  | Stearic acid | Content | Part | 1.0 | 1.0 | 1.0 | 1.0 | 1.0 | 1.0 |
| Non-magnetic layer forming composition | Butyl stearate | Content | Part | 4.0 | 4.0 | 4.0 | 4.0 | 4.0 | 4.0 |
|  | Stearic acid | Content | Part | 1.0 | 1.0 | 1.0 | 1.0 | 1.0 | 1.0 |
|  | Ultrasonic vibration imparting conditions | Imparting time | Second | None | None | 0.5 | 0.5 | None | None |
|  |  | Frequency | kHz |  |  | 30 | 30 |  |  |
|  |  | Intensity | W |  |  | 100 | 100 |  |  |
|  | Magnetic layer forming | Number of times of | Times | 1 | 1 | 2 | 2 | 1 | 1 |

TABLE 1-4-continued

|  |  | Unit | Comparative Example 1 | Comparative Example 2 | Comparative Example 3 | Comparative Example 4 | Comparative Example 5 | Comparative Example 6 |
|---|---|---|---|---|---|---|---|---|
|  | composition preparation conditions / passes of flow-type ultrasonic dispersion device |  |  |  |  |  |  |  |
|  | Number of times of filtering | Times | 1 | 1 | 1 | 1 | 1 | 1 |
|  | Filter hole diameter | μm | 1.0 | 1.0 | 1.0 | 1.0 | 1.0 | 1.0 |
| Physical properties | Center line average surface roughness Ra of magnetic layer (before pressing) | nm | 1.7 | 1.7 | 1.7 | 1.7 | 1.7 | 1.7 |
|  | $S_{after}-S_{before}$ (after pressing) | nm | 3.0 | 3.0 | 3.0 | 3.0 | 3.0 | 3.0 |
|  | $FWHM_{before}$ (after pressing) | nm | 25.0 | 25.0 | 22.0 | 22.0 | 18.0 | 18.0 |
|  | $FWHM_{after}$ (after pressing) | nm | 25.0 | 25.0 | 22.0 | 22.0 | 18.0 | 18.0 |
| Evaluation result | PES | nm | 30 | 30 | 26 | 26 | 20 | 20 |

TABLE 1-5

|  |  |  | Unit | Comparative Example 7 | Comparative Example 8 | Comparative Example 9 | Comparative Example 10 | Comparative Example 11 | Comparative Example 12 |
|---|---|---|---|---|---|---|---|---|---|
| Magnetic layer | Ferromagnetic powder | Kind | — | BaFe | BaFe | BaFe | BaFe | BaFe | BaFe |
|  | Projection formation agent | Kind | — | Projection formation agent 3 | Projection formation agent 1 | Projection formation agent 2 | Projection formation agent 3 | Projection formation agent 1 | Projection formation agent 2 |
| Magnetic layer forming composition | Butyl stearate | Content | Part | 1.0 | 1.0 | 1.0 | 1.0 | 0 | 0 |
|  | Stearic acid | Content | Part | 1.0 | 1.0 | 1.0 | 1.0 | 1.0 | 1.0 |
| Non-magnetic layer forming composition | Butyl stearate | Content | Part | 4.0 | 4.0 | 4.0 | 4.0 | 0 | 0 |
|  | Stearic acid | Content | Part | 1.0 | 1.0 | 1.0 | 1.0 | 1.0 | 1.0 |
|  | Ultrasonic vibration imparting conditions | Imparting time | Second | None | None | None | None | None | None |
|  |  | Frequency | kHz |  |  |  |  |  |  |
|  |  | Intensity | W |  |  |  |  |  |  |
|  | Magnetic layer forming composition preparation conditions | Number of times of passes of flow-type ultrasonic dispersion device | Times | 1 | 2 | 2 | 2 | 2 | 2 |
|  |  | Number of times of filtering | Times | 1 | 1 | 1 | 1 | 1 | 1 |
|  |  | Filter hole diameter | μm | 1.0 | 1.0 | 1.0 | 1.0 | 1.0 | 1.0 |
| Physical properties | Center line average surface roughness Ra of magnetic layer (before pressing) |  | nm | 1.7 | 1.7 | 1.7 | 1.7 | 1.7 | 1.7 |
|  | $S_{after}-S_{before}$ (after pressing) |  | nm | 3.0 | 3.0 | 3.0 | 3.0 | 0 | 0 |
|  | $FWHM_{before}$ (after pressing) |  | nm | 18.0 | 18.0 | 18.0 | 18.0 | 18.0 | 18.0 |
|  | $FWHM_{after}$ (after pressing) |  | nm | 18.0 | 14.0 | 14.0 | 14.0 | 18.0 | 18.0 |
| Evaluation result | PES |  | nm | 20 | 19 | 19 | 19 | 40 | 40 |

TABLE 1-6

| | | Unit | Comparative Example 13 | Comparative Example 14 | Comparative Example 15 | Comparative Example 16 |
|---|---|---|---|---|---|---|
| Magnetic layer | Ferromagnetic powder Kind | — | BaFe | BaFe | BaFe | BaFe |
| | Projection formation agent Kind | — | Projection formation agent 3 | Projection formation agent 1 | Projection formation agent 2 | Projection formation agent 3 |
| Magnetic layer forming composition | Butyl stearate Content | Part | 0 | 1.0 | 1.0 | 1.0 |
| | Stearic acid Content | Part | 1.0 | 1.0 | 1.0 | 1.0 |
| Non-magnetic layer forming composition | Butyl stearate Content | Part | 0 | 12.0 | 12.0 | 12.0 |
| | Stearic acid Content | Part | 1.0 | 1.0 | 1.0 | 1.0 |
| | Ultrasonic vibration imparting conditions | Imparting time Second | None | None | None | None |
| | | Frequency KHz | | | | |
| | | Intensity W | | | | |
| Magnetic layer forming composition preparation conditions | Number of times of passes of flow-type ultrasonic dispersion device | Times | 2 | 2 | 2 | 2 |
| | Number of times of filtering | Times | 1 | 1 | 1 | 1 |
| | Filter hole diameter | μm | 1.0 | 1.0 | 1.0 | 1.0 |
| Physical properties | Center line average surface roughness Ra of magnetic layer before pressing) | nm | 1.7 | 1.7 | 1.7 | 1.7 |
| | $S_{after} - S_{before}$ (after pressing) | nm | 0 | 14.0 | 14.0 | 14.0 |
| | $FWHM_{before}$ (after pressing) | nm | 18.0 | 18.0 | 18.0 | 18.0 |
| | $FWHM_{after}$ (after pressing) | nm | 18.0 | 14.0 | 14.0 | 14.0 |
| Evaluation result | PES | nm | 40 | 42 | 42 | 42 |

For example, in comparison between Examples 1 to 3 and Comparative Examples 3 and 4 in which only the kind of the projection formation agent of the magnetic layer is different, the $FWHM_{before}$ and the $FWHM_{after}$ measured after the pressing are different, although the center line average surface roughness Ra of the magnetic layer before the pressing at 70 atm is the same. It is surmised that the reason of such a generated difference is that the projection formation agent used in Examples 1 to 3 is hardly penetrated into the magnetic layer, although the pressing is performed.

From the result shown in Table 1, it can be confirmed that, in all of the magnetic tapes of the examples, excellent running stability is exhibited after the pressing at 70 atm, that is, in a state corresponding to the state after the long-term storage. According to this magnetic tape, even after the magnetic tape is accommodated in a state of being wound around a reel for a long period of time in the magnetic tape cartridge, after information with a low access frequency is recorded, the stable running can be performed in the magnetic tape device, and the magnetic tape is suitable as a recording medium for archive.

One aspect of the invention is advantageous for various data storages.

What is claimed is:

1. A magnetic tape comprising:
a non-magnetic support; and
a magnetic layer including a ferromagnetic powder, a binding agent, and a fatty acid ester,
wherein the following (1) to (3) are satisfied, after the magnetic layer is pressed at a pressure of 70 atm, the pressing of the magnetic layer being performed by causing the magnetic tape to pass between two rolls while causing the magnetic tape to run at a speed of 20 m/min, with the surface pressure of 70 atm being applied to the surface of the magnetic layer while a tension of 0.5 N/m is applied to the running magnetic tape in a longitudinal direction of the magnetic tape, said pressing being performed by causing the magnetic tape to pass between the two rolls six times in total and applying the surface pressure of 70 atm at each time when passing each roll;

(1) a full width at half maximum of a spacing distribution measured by optical interferometry regarding a surface of the magnetic layer before performing a vacuum heating with respect to the magnetic tape is greater than 0 nm and equal to or smaller than 15.0 nm;

(2) a full width at half maximum of a spacing distribution measured by optical interferometry regarding the surface of the magnetic layer after performing the vacuum heating with respect to the magnetic tape is greater than 0 nm and equal to or smaller than 15.0 nm; and (3) a difference ($S_{after} - S_{before}$) between a spacing $S_{after}$ measured by optical interferometry regarding the surface of the magnetic layer after performing the vacuum heating with respect to the magnetic tape and a spacing $S_{before}$ measured by optical interferometry regarding the surface of the magnetic layer before performing the vacuum heating with respect to the magnetic tape is greater than 0 nm and equal to or smaller than 12.0 nm.

2. The magnetic tape according to claim 1,
wherein the full width at half maximum of a spacing distribution of (1) described above is 0.5 nm to 15.0 nm.

3. The magnetic tape according to claim 1,
wherein the full width at half maximum of a spacing distribution of (2) described above is 0.5 nm to 15.0 nm.

4. The magnetic tape according to claim 1,
wherein the difference of (3) described above is 3.0 nm to 12.0 nm.

5. The magnetic tape according to claim 1,
wherein the magnetic layer includes inorganic oxide-based particles.

6. The magnetic tape according to claim 5,
wherein the inorganic oxide-based particles are composite particles of inorganic oxide and a polymer.

7. The magnetic tape according to claim 1, further comprising:
a non-magnetic layer including a non-magnetic powder and a binding agent between the non-magnetic support and the magnetic layer.

8. The magnetic tape according to claim 1, further comprising:
a back coating layer including a non-magnetic powder and a binding agent on a surface side of the non-magnetic support opposite to a surface side provided with the magnetic layer.

9. The magnetic tape according to claim 1,
wherein the full width at half maximum of a spacing distribution of (1) described above is 0.5 nm to 15.0 nm,
the full width at half maximum of a spacing distribution of (2) described above is 0.5 nm to 15.0 nm, and the difference of (3) described above is 3.0 nm to 12.0 nm.

10. A magnetic tape cartridge comprising:
the magnetic tape according to claim 1.

11. The magnetic tape cartridge according to claim 10,
wherein the full width at half maximum of a spacing distribution of (1) described above is 0.5 nm to 15.0 nm.

12. The magnetic tape cartridge according to claim 10,
wherein the full width at half maximum of a spacing distribution of (2) described above is 0.5 nm to 15.0 nm.

13. The magnetic tape cartridge according to claim 10,
wherein the difference of (3) described above is 3.0 nm to 12.0 nm.

14. The magnetic tape cartridge according to claim 10,
wherein the full width at half maximum of a spacing distribution of (1) described above is 0.5 nm to 15.0 nm,
the full width at half maximum of a spacing distribution of (2) described above is 0.5 nm to 15.0 nm, and the difference of (3) described above is 3.0 nm to 12.0 nm.

15. A magnetic tape device comprising:
the magnetic tape according to claim 1; and
a magnetic head.

16. The magnetic tape device according to claim 15,
wherein the full width at half maximum of a spacing distribution of (1) described above is 0.5 nm to 15.0 nm.

17. The magnetic tape device according to claim 15,
wherein the full width at half maximum of a spacing distribution of (2) described above is 0.5 nm to 15.0 nm.

18. The magnetic tape device according to claim 15,
wherein the difference of (3) described above is 3.0 nm to 12.0 nm.

19. The magnetic tape device according to claim 15,
wherein the full width at half maximum of a spacing distribution of (1) described above is 0.5 nm to 15.0 nm,
the full width at half maximum of a spacing distribution of (2) described above is 0.5 nm to 15.0 nm, and the difference of (3) described above is 3.0 nm to 12.0 nm.

* * * * *